(12) United States Patent
Hokey et al.

(10) Patent No.: US 12,366,250 B2
(45) Date of Patent: Jul. 22, 2025

(54) AIR COMPRESSOR AND BLOWER

(71) Applicant: Howden Roots LLC, Wilmington, DE (US)

(72) Inventors: David Charles Hokey, Brookville, IN (US); Gary Albert Redelman, Connersville, IN (US); Matthew Lynn Simmons, Greenfield, IN (US); Arun Prakash Kumar, Ripon, WI (US); Rodney Dale Roberts, Connersville, IN (US); Jacque Schultz, Springfield, MO (US); Carl Raymond Lewis, Richmond, IN (US); David A. Bell, Connersville, IN (US)

(73) Assignee: ROOTS BLOWERS LLC, Connersville, IN (US)

( * ) Notice: Subject to any disclaimer, the term of this patent is extended or adjusted under 35 U.S.C. 154(b) by 76 days.

(21) Appl. No.: 17/690,363

(22) Filed: Mar. 9, 2022

(65) Prior Publication Data

US 2022/0196026 A1  Jun. 23, 2022

Related U.S. Application Data

(63) Continuation of application No. PCT/US2020/049850, filed on Sep. 9, 2020.
(Continued)

(51) Int. Cl.
*F04D 29/063* (2006.01)
*F04D 25/02* (2006.01)
(Continued)

(52) U.S. Cl.
CPC ........... *F04D 29/063* (2013.01); *F04D 25/02* (2013.01); *F04D 29/053* (2013.01);
(Continued)

(58) Field of Classification Search
CPC combination set(s) only.
See application file for complete search history.

(56) References Cited

U.S. PATENT DOCUMENTS 3,619,086 A  11/1971 Johnson et al.
3,927,890 A  12/1975 Adams, Jr.
(Continued)

FOREIGN PATENT DOCUMENTS

CN  103062380 A  4/2013
CN  206450419 U  8/2017
(Continued)

OTHER PUBLICATIONS

Notification of International Search Report and Written Opinion including International Search Report and Written Opinion for International Application No. PCT/US2020/049850 dated Nov. 20, 2020, 15 pages.
(Continued)

*Primary Examiner* — Binh Q Tran
(74) *Attorney, Agent, or Firm* — Edell, Shapiro & Finnan, LLC

(57) ABSTRACT

A compressor or blower includes an impeller disposed on a high-speed shaft, a motor shaft that extends from an end shield of a motor, a gearbox, and a lubrication system. The gearbox is disposed between the motor and the impeller and includes a pinion disposed on the high-speed shaft and a bull gear disposed directly on the motor shaft in engagement with the pinion. The lubrication system includes a single pump module that is configured to wet bearings on the high-speed shaft prior to starting the motor and to mechanically pump oil to the bearings during operation of the motor.

20 Claims, 25 Drawing Sheets

Related U.S. Application Data

(60) Provisional application No. 62/898,021, filed on Sep. 10, 2019.

(51) Int. Cl.
  *F04D 25/06* (2006.01)
  *F04D 25/08* (2006.01)
  *F04D 29/053* (2006.01)
  *F04D 29/057* (2006.01)
  *F04D 29/06* (2006.01)
  *F04D 29/22* (2006.01)
  *F04D 29/26* (2006.01)

(52) U.S. Cl.
  CPC ........... *F04D 29/057* (2013.01); *F04D 29/22* (2013.01); *F04D 25/0606* (2013.01); *F04D 25/062* (2013.01); *F04D 25/0626* (2013.01); *F04D 25/08* (2013.01); *F04D 29/06* (2013.01); *F04D 29/263* (2013.01)

(56) References Cited

U.S. PATENT DOCUMENTS

| | | | |
|---|---|---|---|
| 4,369,668 A | 1/1983 | Pollak-Banda et al. | |
| 4,533,294 A | 8/1985 | Onal | |
| 4,688,989 A | 8/1987 | Kondo et al. | |
| 4,938,664 A | 7/1990 | Zinsmeyer | |
| 4,997,340 A | 3/1991 | Zinsmeyer et al. | |
| 5,253,986 A | 10/1993 | Bond et al. | |
| 5,309,708 A * | 5/1994 | Stewart, Jr. | F02C 7/32 60/39.15 |
| 6,158,977 A * | 12/2000 | Ochiai | F04D 25/024 417/406 |
| 6,206,653 B1 * | 3/2001 | Dewhirst | F04D 29/063 417/313 |
| 6,632,077 B2 | 10/2003 | Sishtla | |
| 6,935,838 B1 | 8/2005 | Wang | |
| 6,997,686 B2 | 2/2006 | Agrawal et al. | |
| 7,189,003 B2 | 3/2007 | Sopper et al. | |
| 7,789,616 B2 | 9/2010 | Yen et al. | |
| 8,439,020 B1 * | 5/2013 | Carlson | F02B 39/04 123/559.3 |
| 8,578,806 B2 | 11/2013 | Leimann et al. | |
| 8,794,094 B2 | 8/2014 | Leimann et al. | |
| 2011/0142599 A1 * | 6/2011 | Burgess | F04D 29/08 415/127 |
| 2011/0219809 A1 * | 9/2011 | Kurihara | F25B 1/053 62/468 |
| 2011/0243710 A1 * | 10/2011 | Kurihara | F04D 29/063 415/110 |
| 2012/0107099 A1 * | 5/2012 | Jeong | F04D 25/02 415/122.1 |
| 2013/0145879 A1 * | 6/2013 | Nakamura | F16H 57/0441 74/467 |
| 2014/0241887 A1 | 8/2014 | Neuenschwander et al. | |
| 2014/0341710 A1 | 11/2014 | Creamer | |
| 2015/0240830 A1 * | 8/2015 | Czechowski | F04D 29/023 384/368 |
| 2016/0003510 A1 * | 1/2016 | De Larminat | F25B 43/02 62/470 |
| 2019/0218936 A1 * | 7/2019 | Fomison | F16C 33/6659 |
| 2019/0249765 A1 * | 8/2019 | Ito | B60K 1/00 |

FOREIGN PATENT DOCUMENTS

| | | |
|---|---|---|
| CN | 107407281 A | 11/2017 |
| CN | 207004906 U | 2/2018 |
| EP | 2314879 A2 | 4/2011 |
| EP | 2834539 B1 | 5/2016 |
| JP | 8-100788 A | 4/1996 |
| JP | 2012017712 A | 1/2012 |
| JP | 6428434 B2 | 11/2018 |
| KR | 20160064421 A | 6/2016 |
| WO | 2016210119 A1 | 12/2016 |

OTHER PUBLICATIONS

Office Action from the Canadian Intellectual Property Office for Canadian Patent Application No. 3,148,346 dated Apr. 5, 2023, 5 pages.
Chinese Office Action and Search Report with English translation issued Mar. 30, 2024 in corresponding CN Application No. 202080062963.8, 17 pages.
Office Action in counterpart Chinese Application No. 2020800629638 mailed Nov. 29, 2024, 10 pages.

* cited by examiner

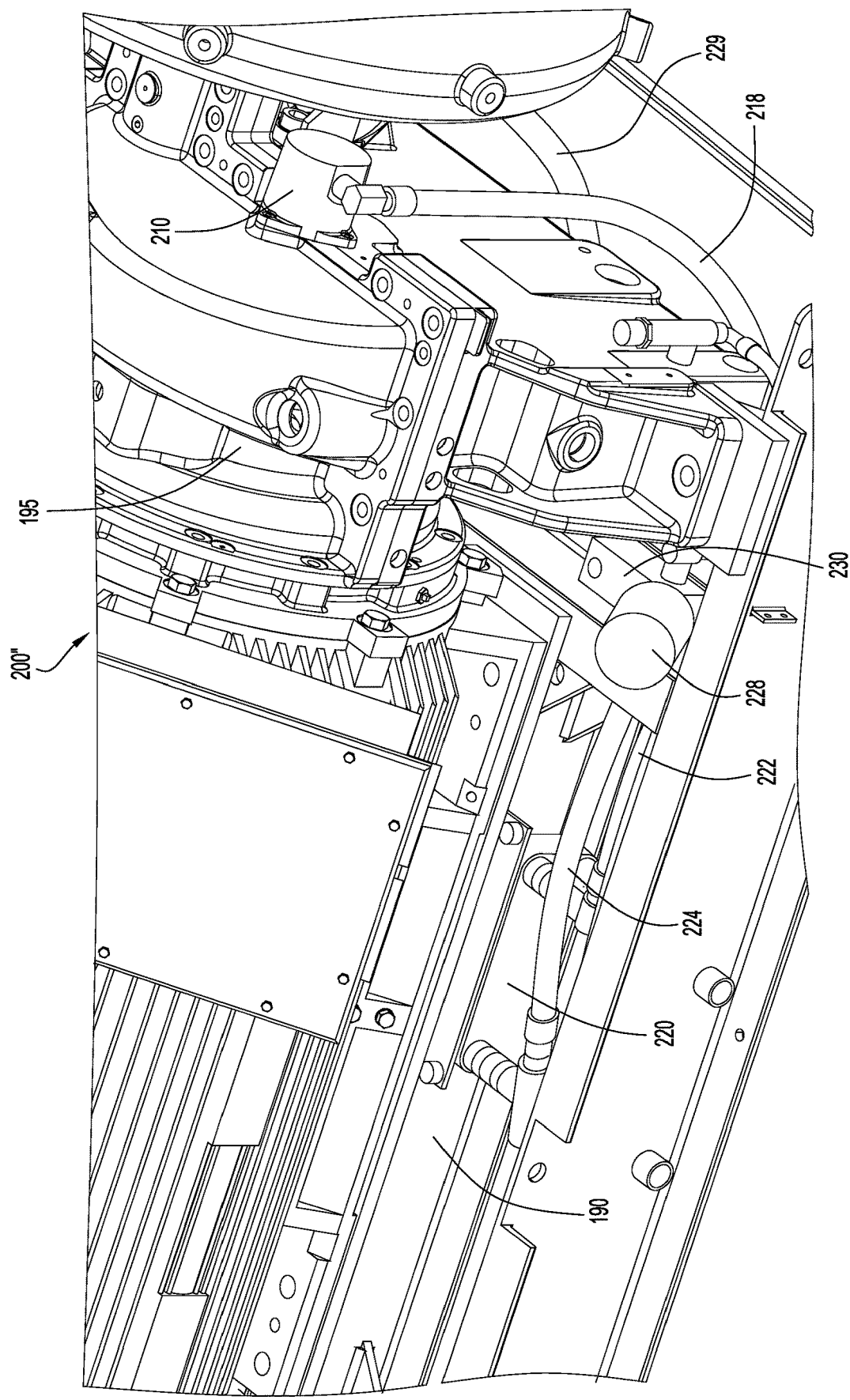

AIR COMPRESSOR AND BLOWER

CROSS REFERENCE TO RELATED APPLICATIONS

This application is a continuation of International Application No. PCT/US2020/049850, which was filed Sep. 9, 2020, and which claims priority to and is based on U.S. Provisional Patent Application No. 62/898,021, filed Sep. 10, 2019. The entire contents of each of which are hereby incorporated by reference.

TECHNICAL FIELD

The present disclosure is directed to a compressor and/or air blower, and in particular, to a split gearbox compressor or blower.

BACKGROUND

Split gearbox compressors and blowers are often quite large and expensive. For example, split gearbox compressors or blowers often have large footprints and, thus, require a large baseplate to support the device, which may be expensive to produce and secure. The footprint is often large because high-speed components in compressors and blowers often require extensive lubrication systems and expansive couplings. Smaller and more inexpensive compressors and blowers are desired.

SUMMARY

The present disclosure is directed towards a split gearbox compressor or blower (which may be configured as a horizontal or vertical split gearbox compressor/blower). The compressor or blower includes a streamlined lubrication system with a single pump module and a streamlined coupling between an impeller and a motor. In particular, according to one embodiment, a compressor or blower includes an impeller disposed on a high-speed shaft, a motor shaft that extends beyond (e.g., overhangs) an end shield of a motor, a gearbox, and a lubrication system. The gearbox is disposed between the motor and the impeller and includes a pinion disposed on the high-speed shaft and a bull gear disposed directly on the motor shaft in engagement with the pinion. The lubrication system includes a single pump module that is configured to wet bearings on the high-speed shaft prior to starting the motor and to mechanically pump oil to the bearings during operation of the motor.

In at least some embodiments, the pinion is bounded by thrust collars and the high-speed shaft is supported by hydrodynamic bearings. Moreover, in at least some embodiments, the bearings are hydrodynamic bearings. Still further, in at least some embodiments, the pump module includes an injector that wets the bearings and a mechanically driven pump that is disposed on the motor shaft.

BRIEF DESCRIPTION OF THE SEVERAL VIEWS OF THE DRAWINGS

FIGS. 17A and 17B are perspective views of yet another example embodiment of a lubrication system that may be included in the compressor of FIGS. 1 and 2, with FIG. 17B depicting the lubrication system of FIG. 17A installed on the compressor of FIGS. 1 and 2.

Like numerals identify like components throughout the figures.

DETAILED DESCRIPTION

Overall, the compressor/blower presented has a small form factor and enhanced efficiency. To achieve the small form factor, the compressor/blower includes a bull gear disposed (e.g., mounted) directly on a motor shaft, which eliminates any couplings between the bull gear and the motor shaft. Moreover, the compressor presented herein includes a high-speed shaft supported by hydrodynamic bearings, which can start when wet (as opposed to requiring full pressurization), and a lubrication system that includes a single pump module. The pump module is driven mechanically by the motor shaft on which the bull gear is disposed (e.g., mounted), but is also configured to wet the hydrodynamic bearings prior to startup of the compressor (i.e., to coat the bearings with lubricant (e.g., oil)). However, since the hydrodynamic bearings can start while wet, the pump module need not provide fully pressurized lubricant (e.g., oil) to the hydrodynamic bearings prior to startup. Thus, the compressor/blower need not include an auxiliary pump system, which increases the size and cost of many other known split gearbox compressors/blowers.

Figure 1:
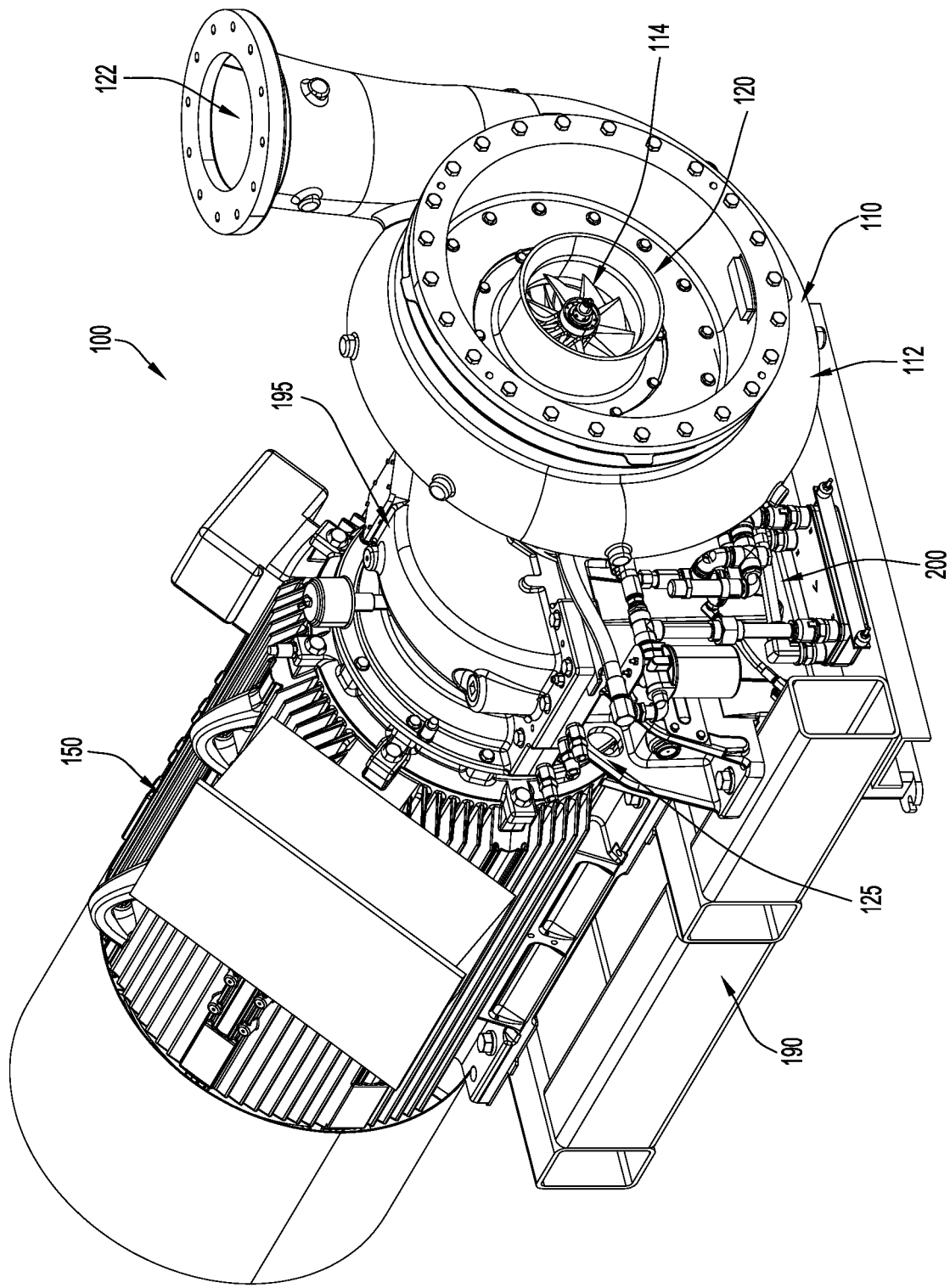
FIGS. 1 and 2 are perspective views of a compressor formed in accordance with an embodiment of the present disclosure.
Figure 2:
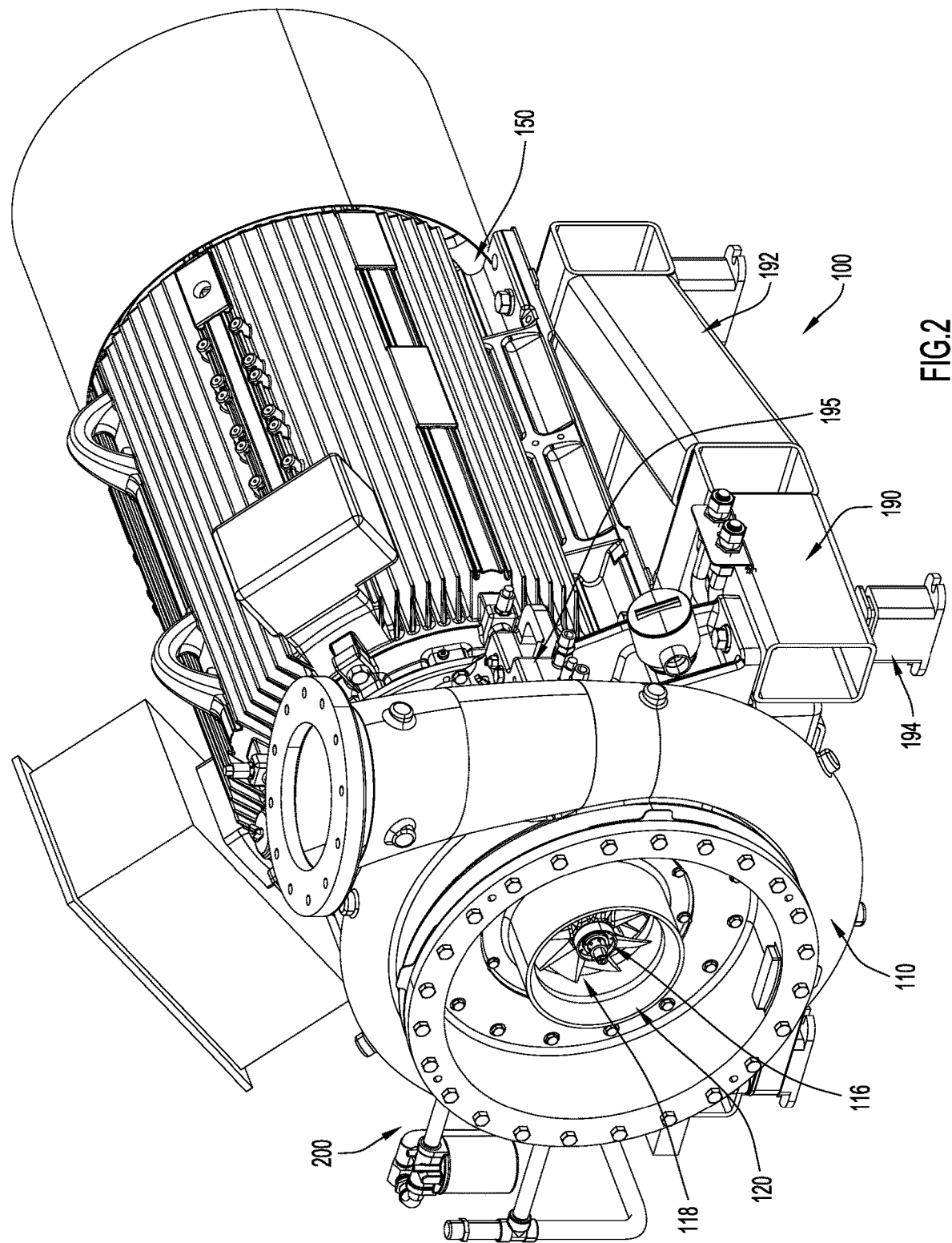
Figure 3:
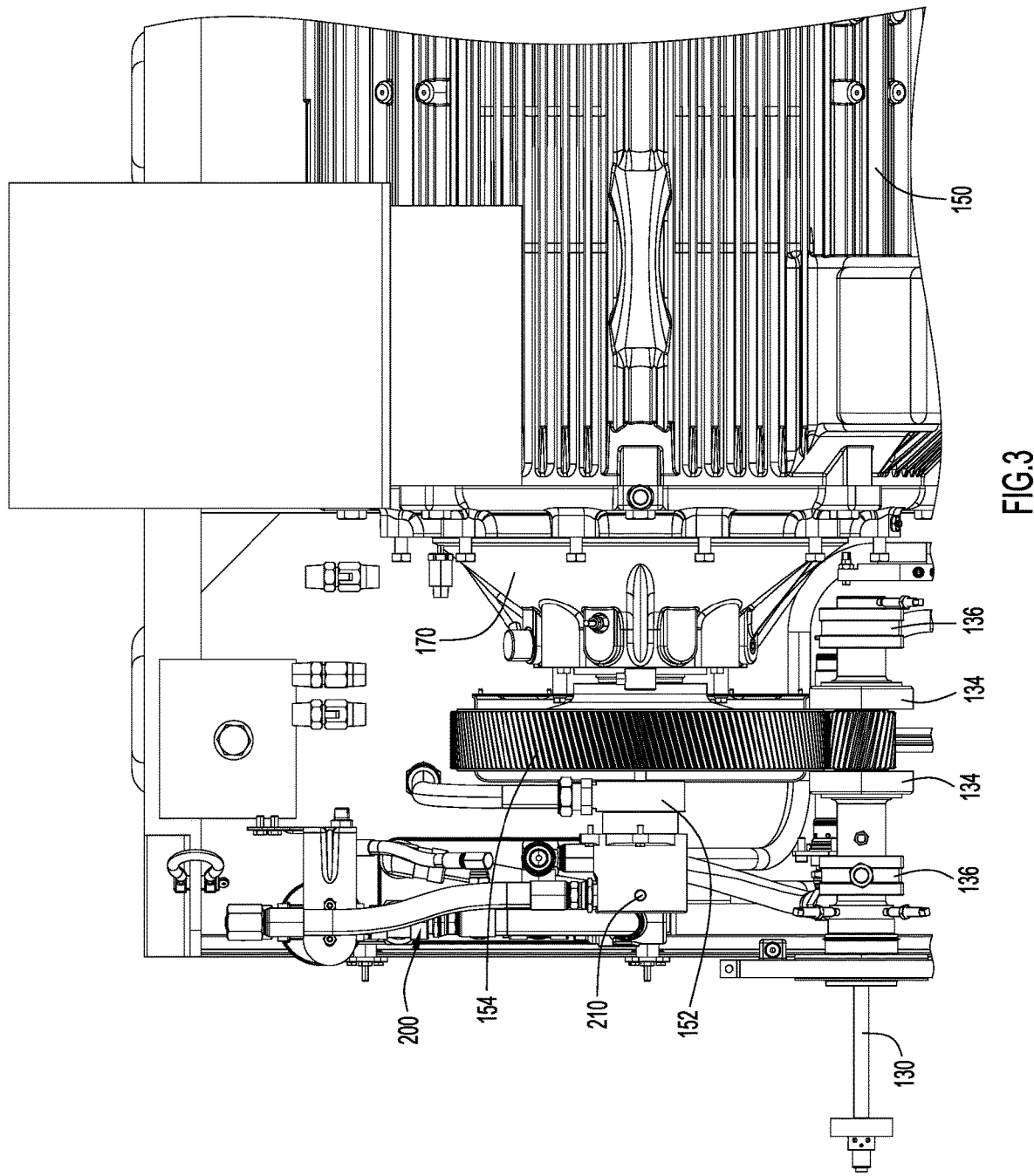
FIG. 3 is a top view of the compressor of FIGS. 1 and 2, with various components removed to show internal components of the compressor's gearbox.
Figure 4:
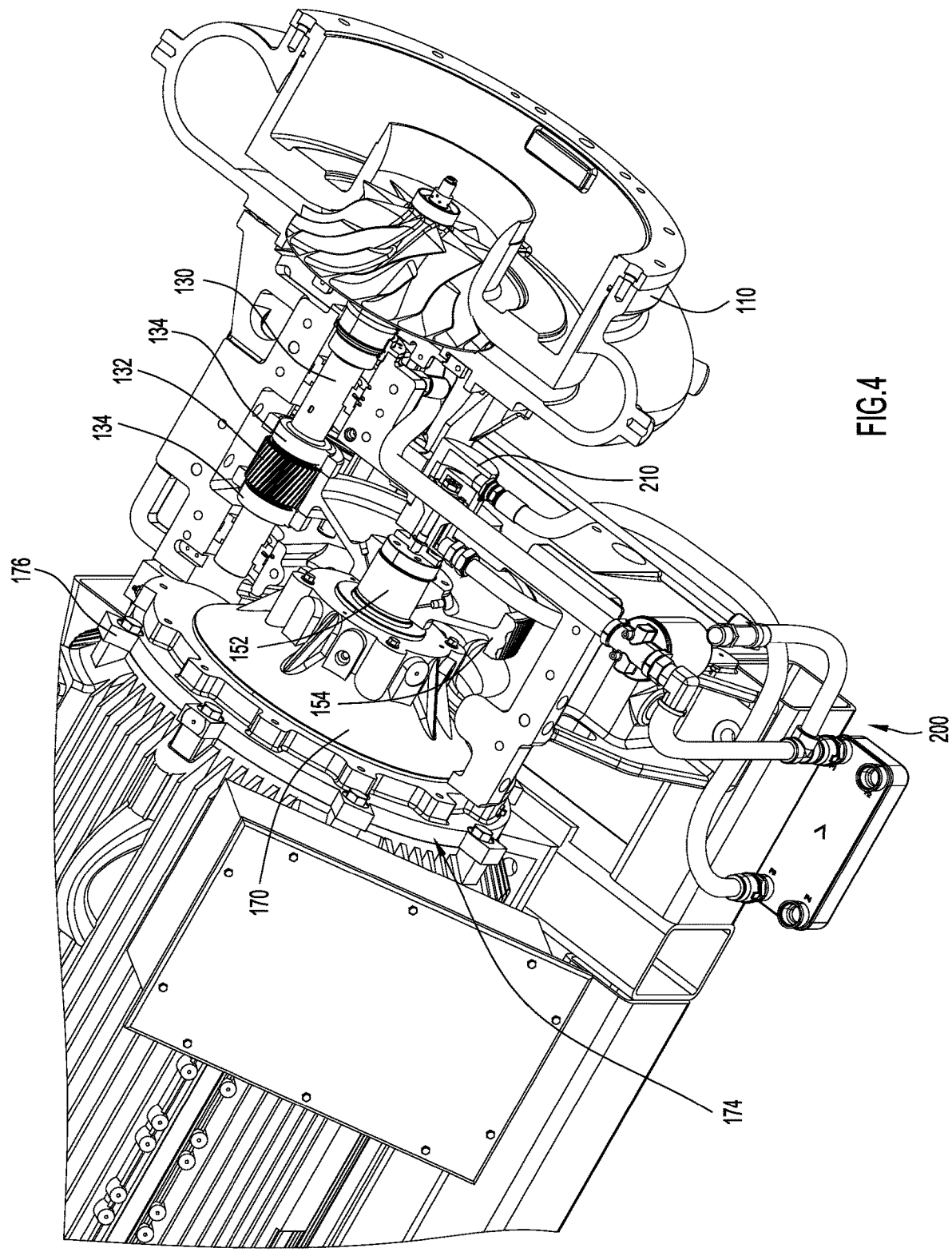
FIGS. 4 and 5 are a perspective and top view of a sectional cut view of the compressor of FIGS. 1 and 2.
Figure 5:
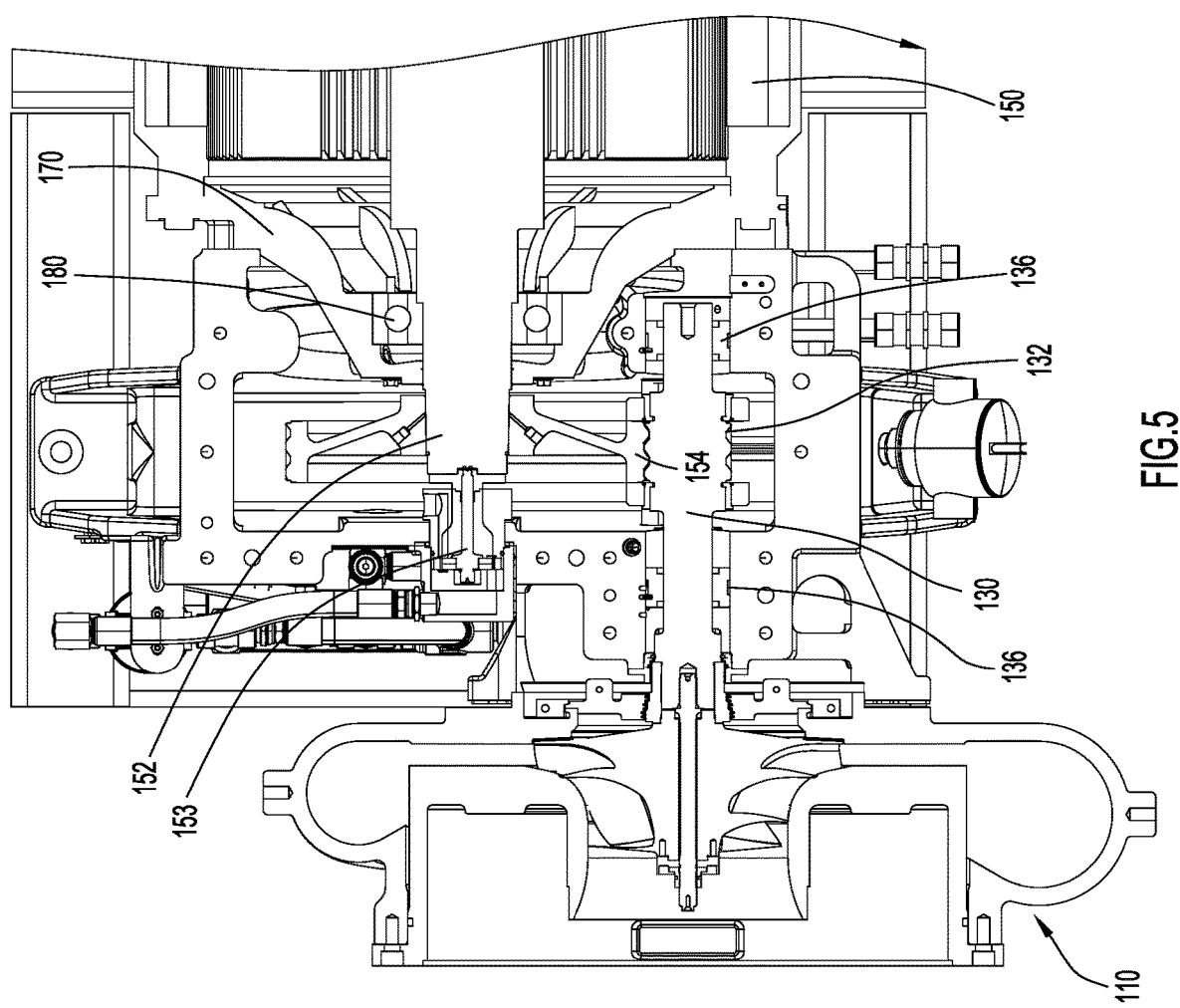
Figure 6:
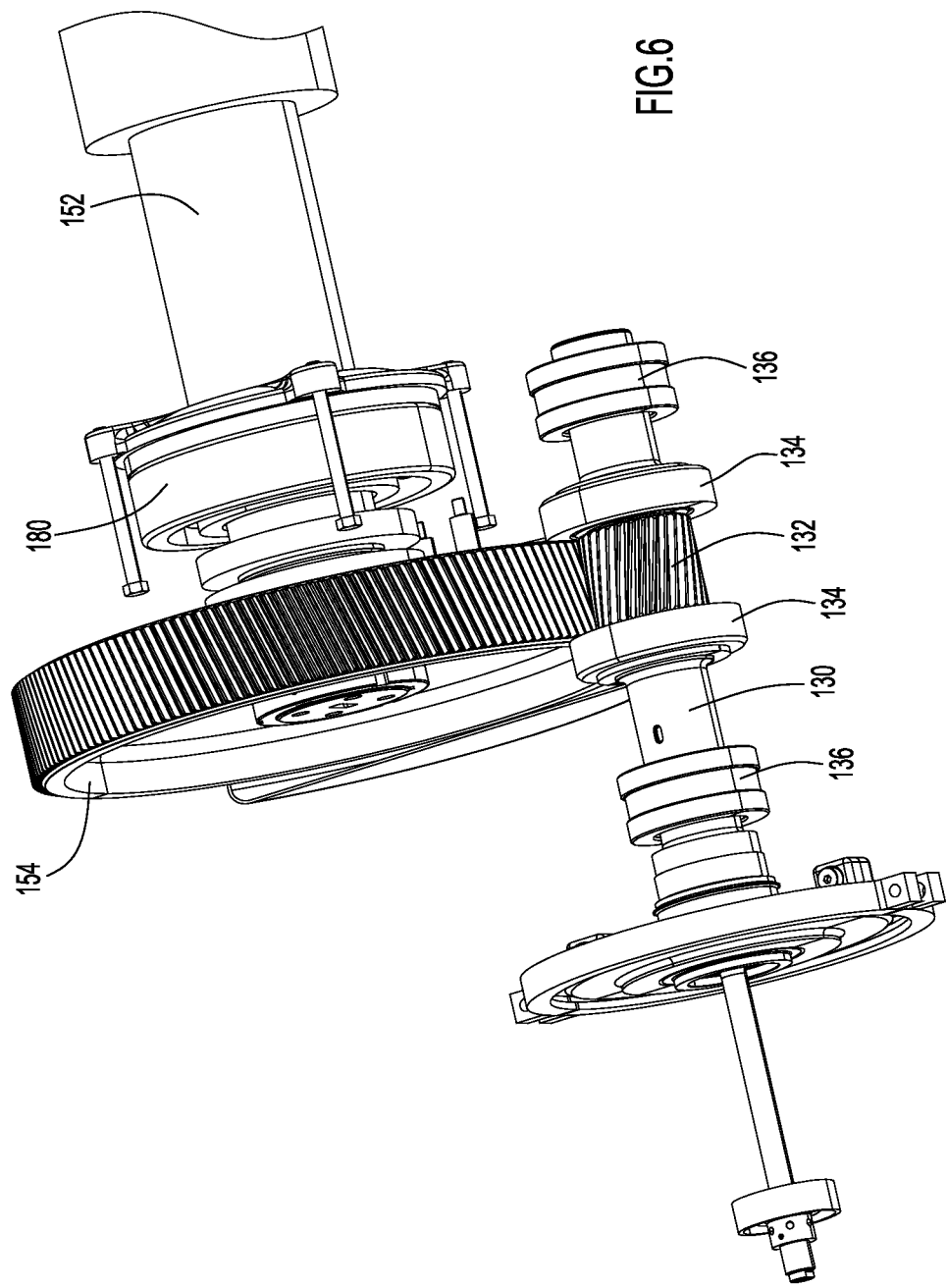
FIG. 6 is a perspective view of components included in the gearbox of the compressor of FIGS. 1 and 2 while removed from the compressor.

FIGS. 1 and 2 illustrate an example embodiment of a compressor formed in accordance with the present application. The compressor includes a volute 110 at one end, a motor 150 at its other end, and a gearbox 125 disposed therebetween. The volute 110 includes a casing 112 that surrounds an impeller 114. An eye 116 of the impeller 114 is fixedly mounted on a high-speed shaft 130 that extends to the gearbox 125. Thus, as high-speed shaft 130 rotates, the high-speed shaft 130 drives rotation of the impeller's blades 118 to draw air in through an inlet 120 and move the air towards an outlet 122. Notably, the casing 112 is disposed at an end of the compressor 100 and, thus, the impeller 114 may be easily accessed by removing a portion of the casing 112. By comparison, vertically split multistage compressors often need to be removed from their baseplate and taken apart piece by piece before their impellers can be inspected.

In various embodiments, the volute 110 can include inlet guide vanes or diffuser vanes; however, importantly, the volute 110 only includes one impeller 114. The motor 150 drives rotation of the impeller 114, as is described in further detail below. That said, the motor 150 and volute 110 shown in FIGS. 1 and 2 are merely examples and, in other embodiments, the motor 150 and the volute 110 may be formed in any manner now known or developed hereafter, provided that the motor 150 can generate rotational force and the volute 110 can draw in and force out air.

Each of the volute 110, the gearbox 125, and the motor 150 are supported by an assembly frame 190. In this particular embodiment, the assembly frame 190 is formed from a collection of structural members 192 that are connected together in a rectangular shape and supported atop of feet 194 (e.g., vibration isolation feet). The structural members 192 generally support the peripheral edges of the motor 150, the gearbox 125, and the volute 110 and include crossbeams extending beneath at least the gearbox 125 and the motor 150. The structural members 192 can be tubular, C-shaped members, solid, hollow, or any other type of structural member. As mentioned, features of compressor 100 enable the overall footprint of the compressor 100 to be reduced as compared to similar compressors (for reasons explained below). Thus, in some embodiments, the assembly frame 190 may span a footprint of approximately four feet wide and approximately four to six feet long. By comparison, many compressors that produce comparable outputs (examples of which are show and described in connection with FIG. 19) may have footprints that are six feet wide by twelve to fifteen feet long.

In addition to the baseplate, the compressor 100 may include covers or housings to encapsulate certain components (e.g., to protect the components from contaminants and/or for safety concerns). In the depicted embodiment, the gearbox 125 is covered by housing 195. The gearbox housing 195 may be sized to cover a wide variety of components needed for different setups, such as gears included in compressors operating at a frequency in the range of 20-60 Hz. Additionally, in the depicted embodiment, the housing 195 includes a top half and a bottom half and houses many, if not all, of the compressor components that require regular maintenance. Thus, components of the compressor 100 (e.g., the gears and drive shafts) can be easily accessed and inspected by removing only the top half of housing 195, without dismantling the drive train. For example, bearings included in gearbox 125 can be inspected without being removed from gearbox 125. By comparison, the bearings of vertically split multistage compressors often need to be removed from their gearboxes for inspection and are often not inspected while disposed within the compressor. The housing 195 may also cover at least a portion of a lubrication system 200 included on the compressor 100. The housing 195 may cover the components of the gearbox 125 and the lubrication system 200 alone or collectively with other elements.

FIGS. 3-6 illustrate various components of the gearbox 125 with the housing 195 completely removed, partially removed, or shown in a sectional view. Thus, these Figures illustrate the interplay between the high-speed shaft 130 and the motor 150. Notably, a bull gear 154 is disposed (e.g., mounted) directly on a motor shaft 152 that overhangs (e.g., extends beyond) an end shield 170 of the motor 150. The bull gear 154 directly engages a pinion 132 included on the high-speed shaft 130 and, thus, directly transfers rotational energy generated by motor 150 to the high-speed shaft 130. In some embodiments, the pinion 132 is formed integrally with the high-speed shaft 130, but in other embodiments, the pinion 132 is formed separately from the high-speed shaft 130 and mounted thereon. The pinion 132 is bounded by a pair of thrust collars 134 and is supported by a pair of hydrodynamic bearings 136 that are disposed exteriorly of the thrust collars 134 (see FIG. 3). Notably, since the pinion 132 directly engages a bull gear 154 disposed (e.g., mounted) on the motor shaft 152, the compressor need not include a separate bull gear shaft, with its own bearings, guards, supports, etc., and there is no need to couple this gear to the motor shaft. Thus, the compressor 100 eliminates many components as compared to compressors that mount a bull gear 154 on its own shaft.

The pinion 132 and thrust collars 134 may vary in size for different implementations, but each contemplated size will fit within the gearbox housing 195. The hydrodynamic bearings 136 on the other hand, may be the same for many, if not all, implementations. The bearings 136 are "hydrodynamic" because the bearings do not include a roller element or anti-friction element. Thus, if lubricated properly, the bearings 136 may have an infinite life. As is explained in further detail below, the thrust collars 134 engage a rim of the bull gear 154 and transfer axial forces generated by the thrust of the impeller 114 to the bull gear 154 to ensure the pinion 132 remains meshed with the bull gear 154 and to prevent thrust loading on the pinion bearings 136. The hydrodynamic bearings 136 allow rotation of the high-speed shaft 130 within gearbox 125 and may start when wet (as opposed to starting with full pressure lubrication). Moreover, in at least some embodiments, the hydrodynamic bearings 136 may be horizontally split hydrodynamic bearings. Horizontally split hydrodynamic bearings 136 allow a bottom half of the bearings 136 to sit in the gearbox housing 195 prior to installation of the high-speed shaft 130 (see FIG. 5). Then, after the high-speed shaft 130 is installed, the top half of the horizontally split hydrodynamic bearings 136 can be installed over the high-speed shaft 130. As an example, in FIG. 6 horizontal lines illustrate the split between halves of the bearing 136.

By comparison, only one bearing 180 (referred to herein as motor bearing 180) supports the motor shaft 152 for rotation in the gearbox 125. The bearing 180 is a roller bearing and, thus, can absorb a thrust load transferred to the motor shaft 152 by thrust collars 134. The bearing 180 is disposed between the bull gear 154 and the motor 150 and is sealed adjacent the motor 150 with an end shield 170. In order to provide a strong seal 174 between the end shield 170 and the remainder of motor 150, the end shield includes gussets 172 that increase the structural integrity of the end shield 170 and fastening flanges 176 that provide a secure connection to the remainder of the motor 150. On the other side of the bull gear 154 (referred to as the distal side), the motor shaft 152 includes a pump drive member 153. The pump drive member 153 is configured to engage and drive a mechanical pump included in the pump module 210 of the lubrication system 200 so that the lubrication system delivers lubricant (e.g., oil) to various elements of the gearbox 125 during operation of the motor 150, as is described in further detail below.

Figure 7:
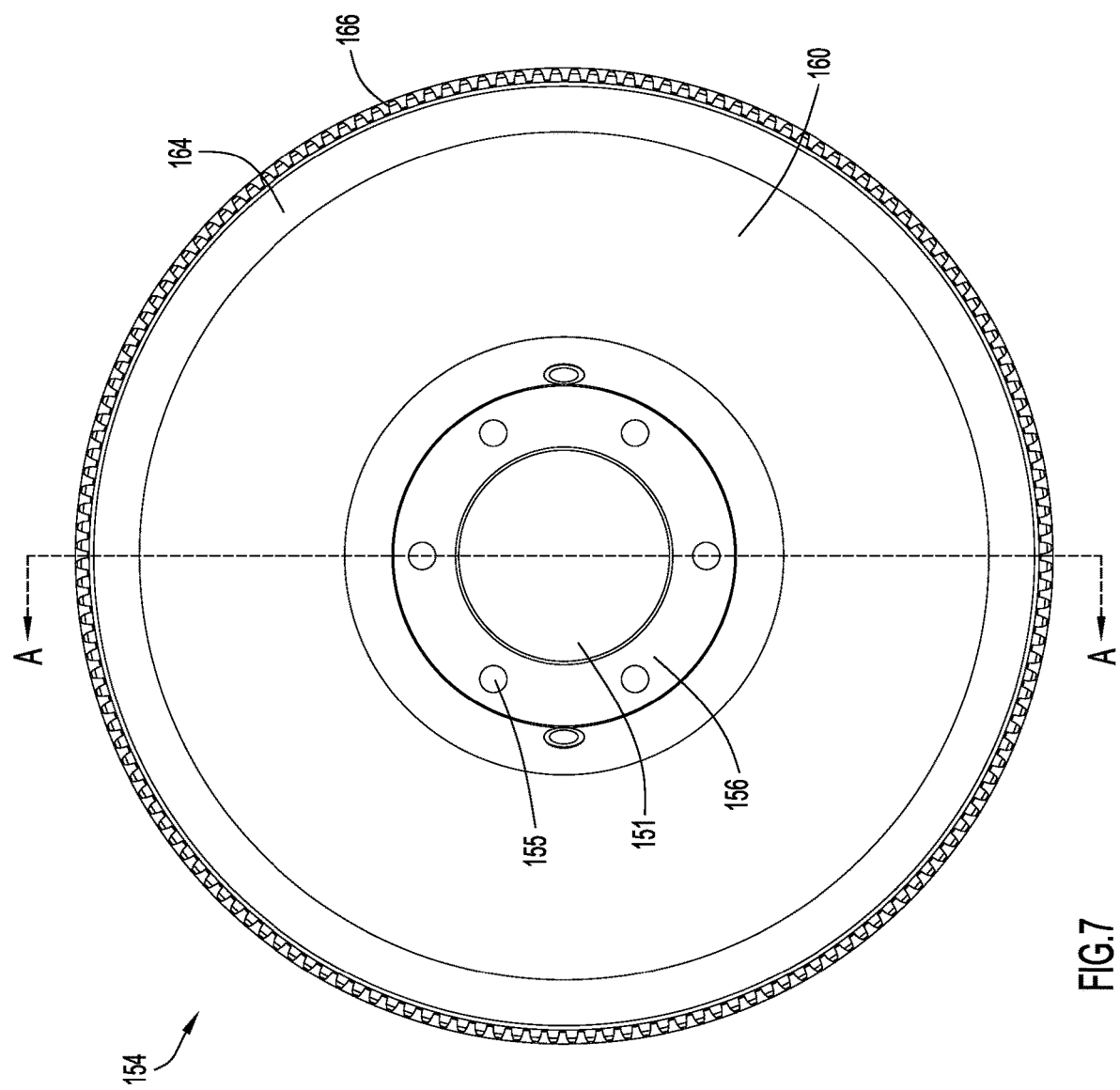
FIG. 7 is a front view of a bull gear included in the gearbox components shown in FIG. 6.
Figure 8:
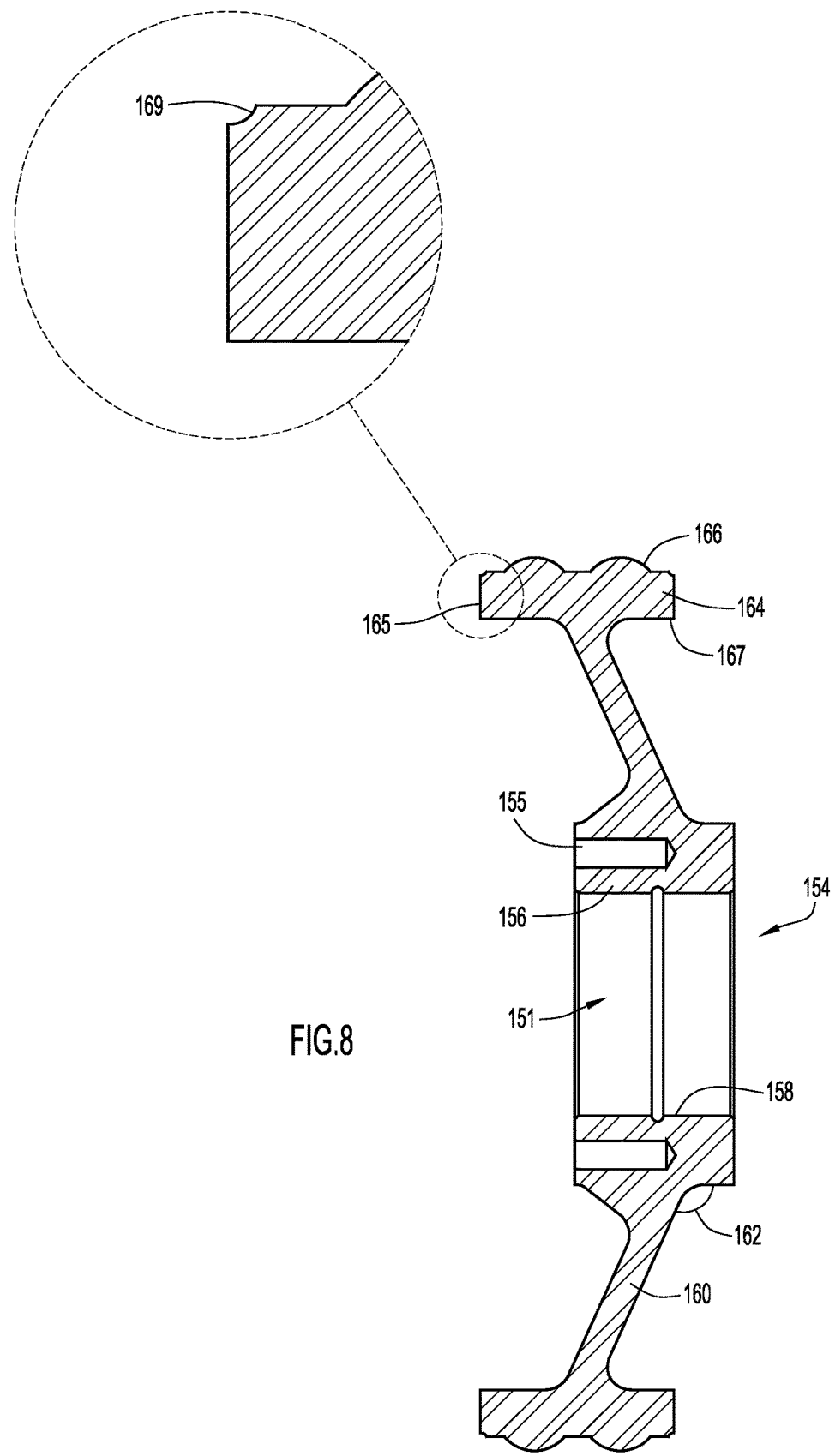
FIG. 8 is a side sectional view of the bull gear of FIG. 7 taken along line A-A of FIG. 7.

Now turning to FIGS. 7 and 8, the bull gear 154 includes a mounting portion 156, a radial flange 160, and an outer rim 164. The mounting portion 156 includes a central opening 151 that is sized to receive the motor shaft 152 and apertures 155 sized to receive fasteners so that the bull gear 154 can be secured to the motor shaft 152. As can be seen in the sectional view of FIG. 8, in the depicted embodiment, the central opening 151 includes a tapered inner edge 158. The tapered inner edge 158 narrows from a proximate side of the bull gear 154 (the side disposed closed to the motor 150) to a distal side of the bull gear 154 (the side disposed closer to the pump module 210). The taper may match or mate with a taper included on the motor shaft and may facilitate secure engagement of the bull gear 154 to the motor shaft 152 (e.g., so that the bull gear 154 swages into place on the motor shaft 152).

The radial flange 160 extends between the mounting portion 156 and the outer rim 164. As can be seen in FIG. 8, the radial flange 160 is a substantially straight extension (e.g., its sides are parallel to each other), but extends away from the mounting portion 156 at a pitch angle 162 that is greater than 90 degrees, but less than 180 degrees. For example, the pitch angle 162 may be between 100 and 120 degrees. Thus, the outer rim 164 extends beyond the distal side of the mounting portion 156. In fact, in some embodiments, a center of the outer rim 164 may align or approximately align (e.g., be within 10 mm of) with the distal side of mounting portion 156. Put another way, the pitch angle 162 moves the outer rim 164 away from the motor 150 and also serves to counterbalance the outer rim 164 against overhung misalignment of the bull gear 154, which ensures gear tooth contact between the bull gear 154 and the pinion 132.

The outer rim 164 includes the teeth 166 of the bull gear 154 and extends from a first side 165 to a second side 167. Sides 165 and 167, which may also be referred to as thrust faces, may engage the thrust collars 134 that bracket the pinion 132 to transfer an axial load of the impeller 114 (generated during rotation of the impeller 114) from the thrust collars 134 to the bull gear 154, and eventually to rolling bearing 180 (see FIG. 15). More specifically, the distal thrust face 165 may absorb thrust while the pitch angle 162 of the bull gear and the proximal thrust face 167 collectively compensate for axial (e.g., thrust) forces generated by rotation of the impeller 114. This may prevent unwanted axial deflection that would cause the pinion 132 to disengage from bull gear 154 (or vice versa). In fact, in at least some embodiments, the radial flange 160 and pitch angle 162 may allow the outer rim 164 to deflect into tight engagement with the pinion 132. As is shown in the inset included in FIG. 8, the top edge of each of sides 165 and 167 may include a chamfer 169. The chamfer 169 may comprise a concave (i.e., inward) rounding of a corner that provides relief between the teeth 166 of the outer rim 164 and the thrust faces 165 and 167.

Figure 9:
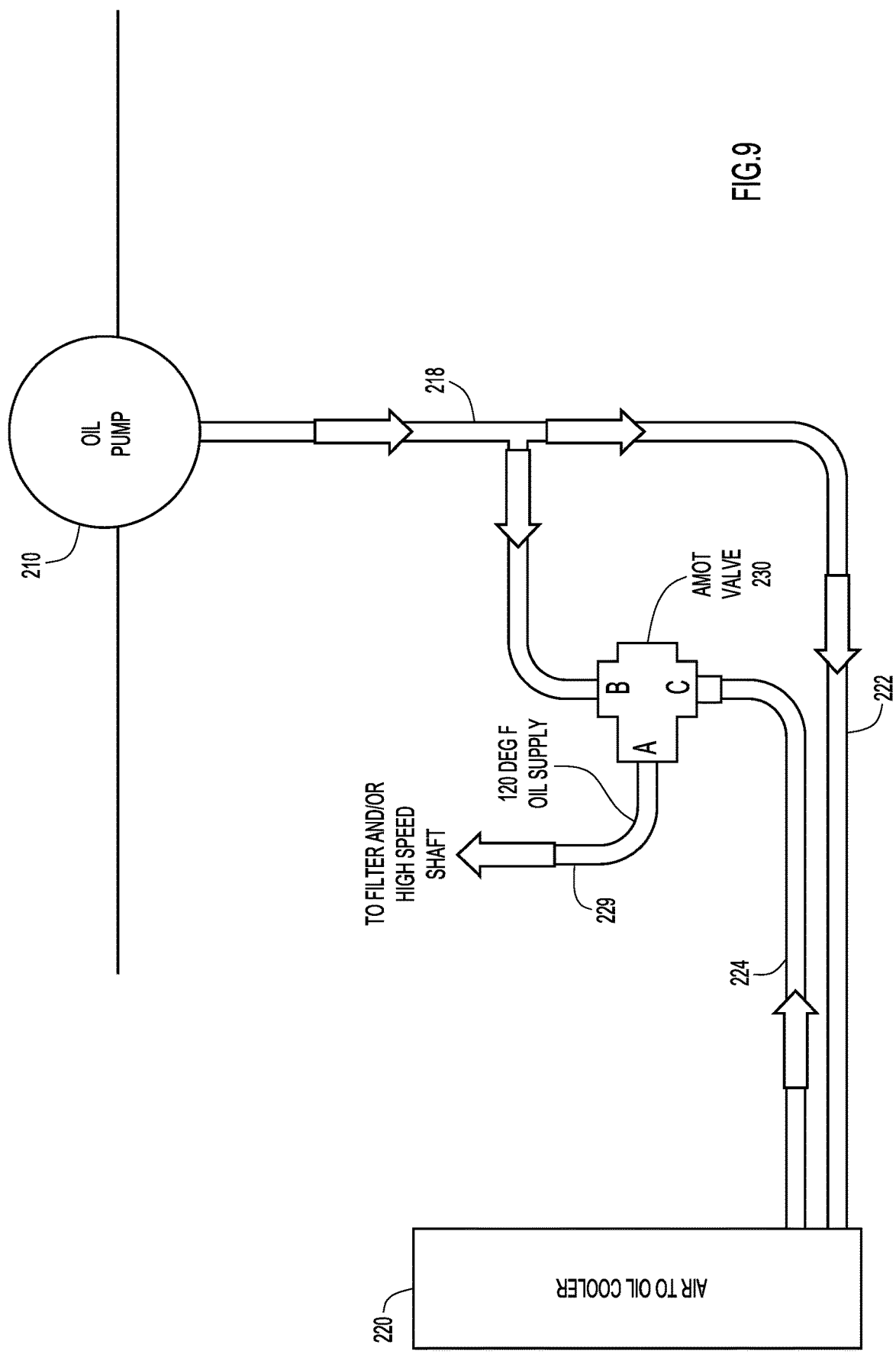
FIG. 9 is a block diagram illustrating a lubrication system included in the compressor of FIGS. 1 and 2.
Figure 15:
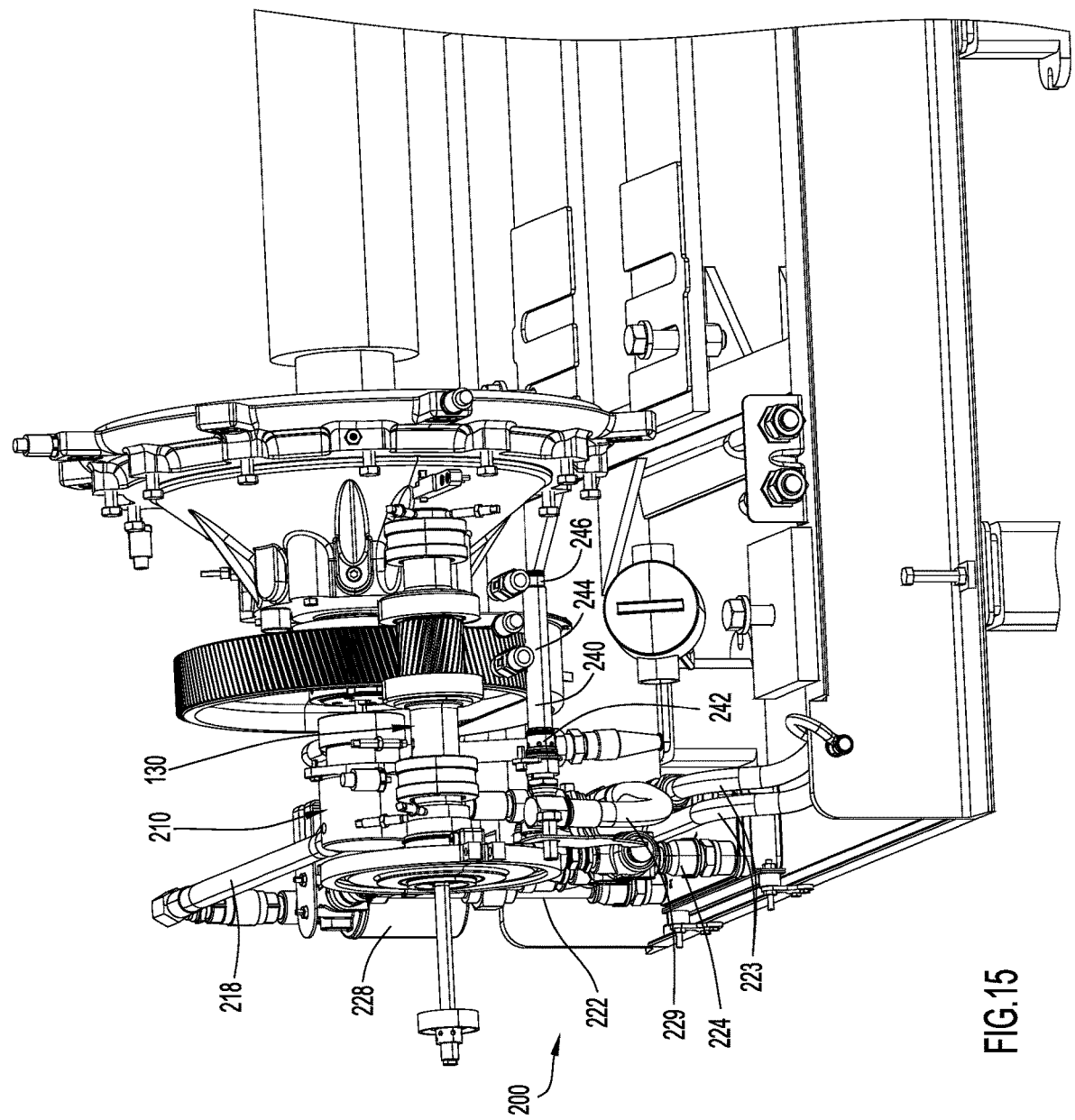

Now turning to FIGS. 9-15, the lubrication system 200 of compressor 100 includes, at a high-level, a pump module 210, a cooler 220, a filter 228 (see FIGS. 12-15), and a lubricant rail 240 (see FIG. 15). Generally, the pump module 210 pushes or pumps lubricant (e.g., oil) through the cooler 220 and filter 228 towards the rail 240, which distributes lubricant (e.g., oil) to components of the gearbox 125. FIG. 9 depicts an initial portion of the lubrication system diagrammatically. In particular, FIG. 9 illustrates a pump module 210 pumping lubricant (e.g., oil) to a supply line 218. The supply line 218 is a Y-shaped or forked supply line, that splits into two paths. One path connects the pump module 210 to a control valve 230, which may be a temperature control valve (e.g., a temperature control valve by AMOT Controls Corp., of Richmond, California) and/or a pressure control valve, while the other path connects the pump module 210 to an intake line 222 for cooler 220 (e.g., via a valve and/or fitting). The cooler 220 outputs cooled lubricant back towards the control valve 230 via outlet line 224.

The control valve 230 then outputs lubricant to an output line 229 towards a filter 228 and the high-speed shaft 130 (via rail 240). However, in other embodiments, such as the embodiment depicted in FIGS. 12-15, the filter 228 is disposed upstream of the control valve 230. Alternatively, a filter and/or a pressure relief valve may be included in the control valve 230. If the control valve 230 includes a pressure control valve, a temperature control valve, a pressure relief valve, and a filter, assembly of the compressor might be completed by connecting tubes between the control valve 230, the pump module 210, and other components of the compressor/blower (e.g., the lubrication rail and the cooler).

Figure 11:
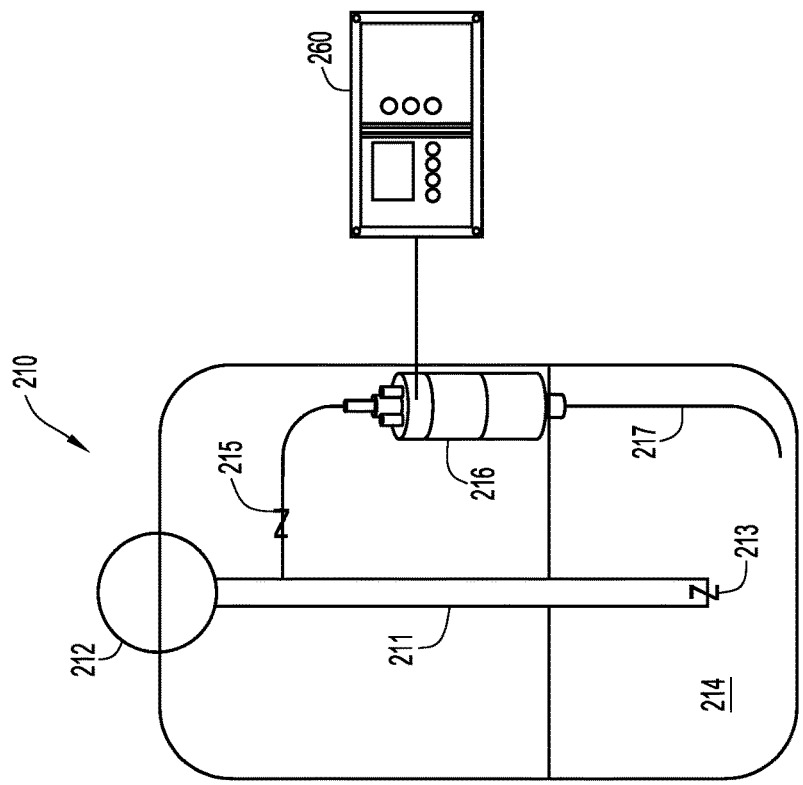
FIGS. 10 and 11 are diagrammatic illustrations of a pump module included in the lubrication system of FIG. 9.
Figure 10:
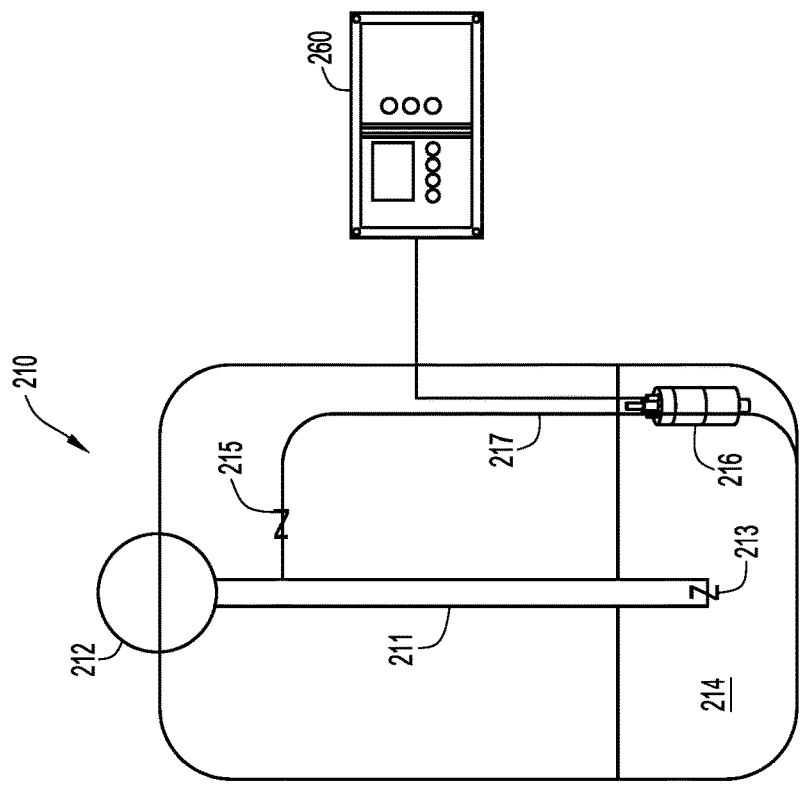
Figure 12:
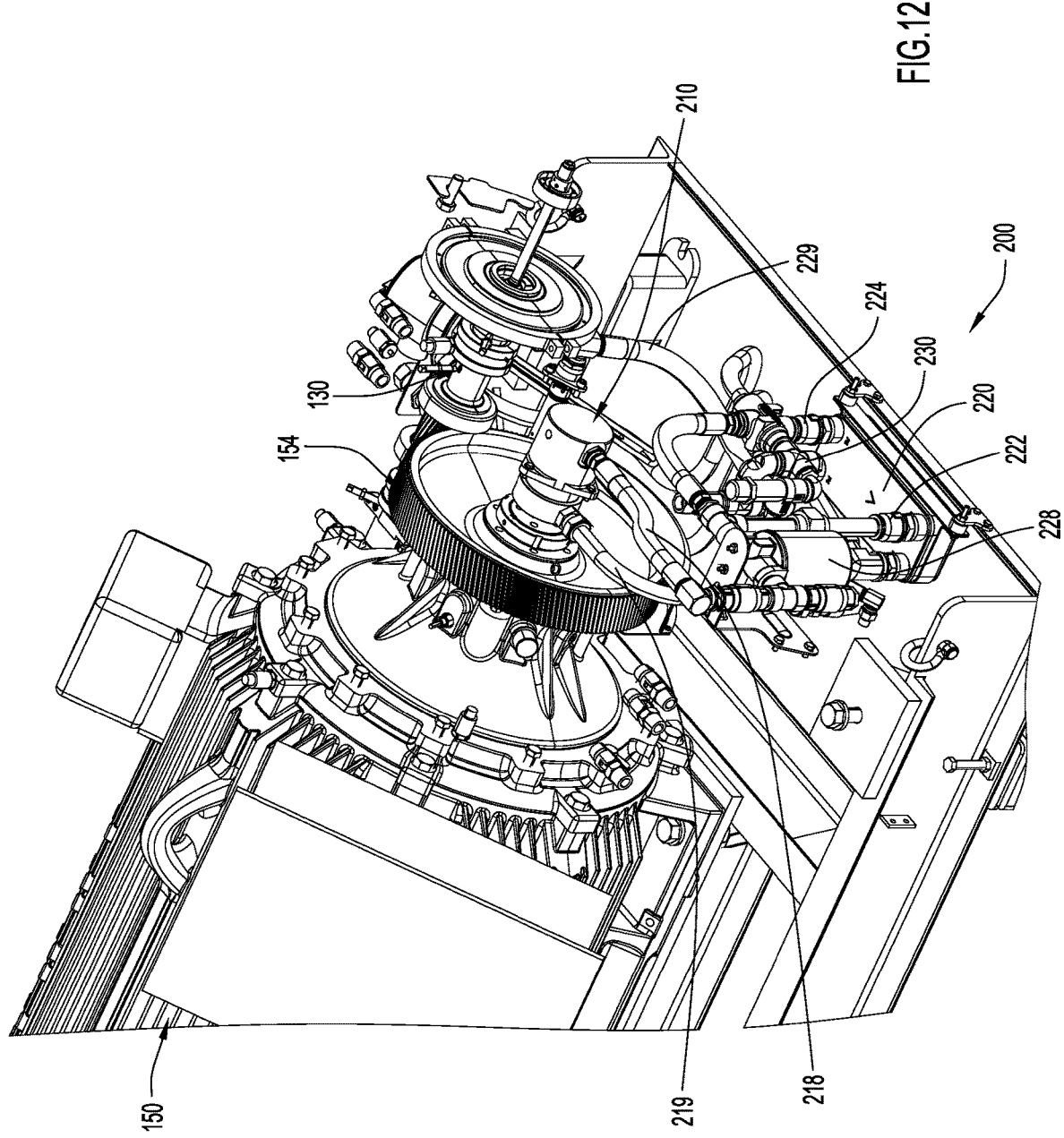
FIGS. 12-15 are perspective views of the compressor of FIGS. 1 and 2, with various components removed to show the lubrication system included in the compressor of FIGS. 1 and 2.
Figure 13:
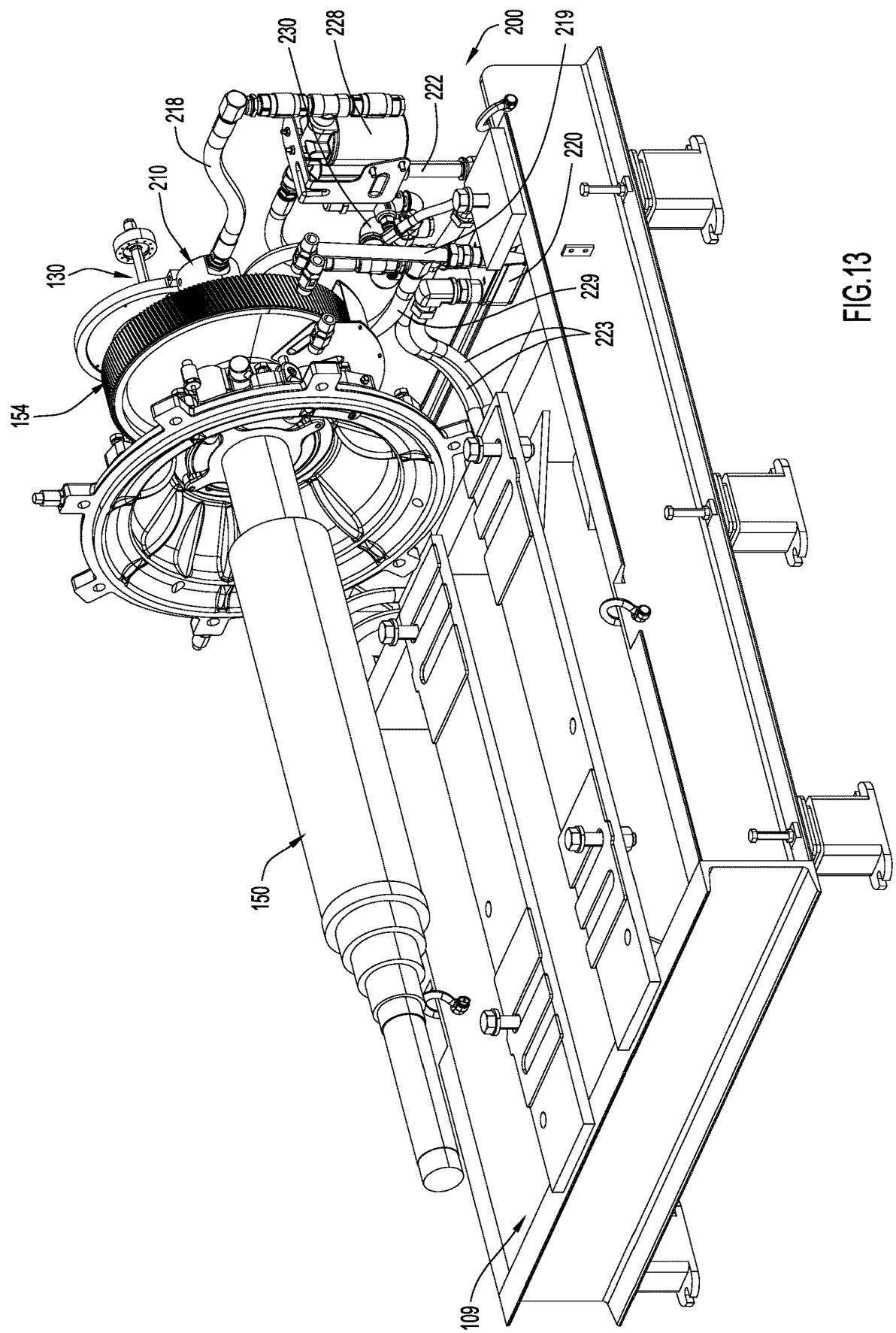
Figure 14:
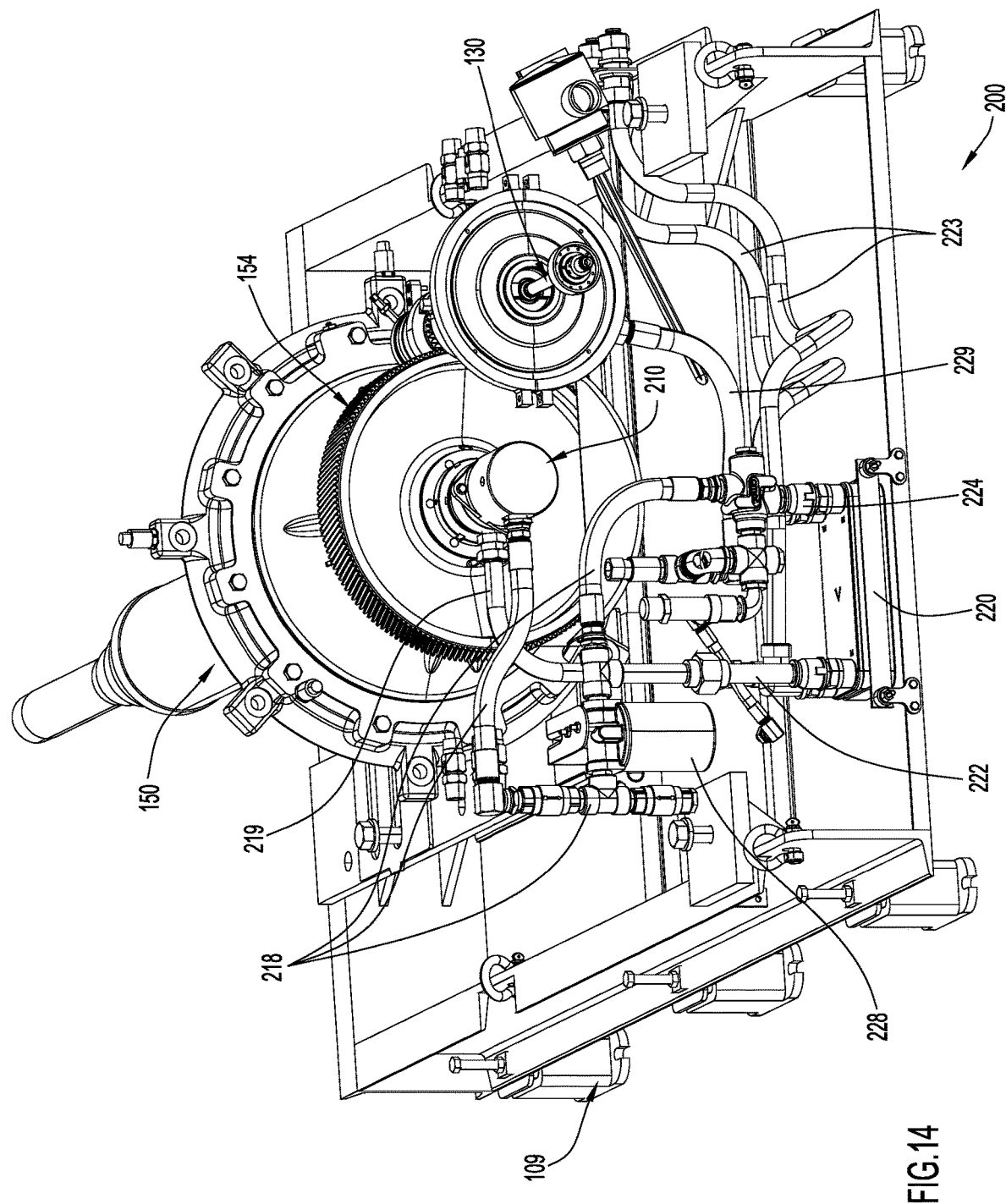

FIGS. 10 and 11 depict two example embodiments of a pump module 210. Each pump module 210 includes a pump 212 and an injector 216. Pump 212 is mechanically driven by the pump drive member 153 (see FIG. 5), which rotates with and/or is rotated by the motor shaft 152, and upon being driven, draws lubricant (e.g., oil) from sump 214 via suction line 211. In at least some embodiments, a bottom end of suction line 211 may be capped by check valve 213 that can be opened or closed by controller 260. Since the pump 212 is driven by rotation of the motor shaft 152, the pump 212 only operates when the motor is operating. Moreover, since many lubricants have a low viscosity, a wide variety of pumps can be used as pump 212, including diesel and plunger-style pumps.

Meanwhile, the injector 216 can push lubrication to the hydrodynamic bearings 136 prior to rotation of the motor shaft 152. As is shown in FIG. 10, in some embodiments, the injector 216 may be disposed in the sump 214 and may push lubricant out through supply line 217 (which may include a check valve 215). The pump 212 may include sufficient clearance between its components to allow lubricant received from supply line 217 to enter the same tubing system that is used to pump lubricant from pump 212 (e.g. the lubricant from injector may pass through pump 212 and enter supply line 218). Alternatively, and as is shown in FIG. 11, the injector 216 could be disposed above the lubricant disposed in sump 214. Either way, the injector 216 may be a 12- or 24-volt injector powered from a local control panel (e.g., controller 260) and will inject lubricant through the lubrication system 200 all the way to the hydrodynamic bearings 136. Moreover, although the injector 216 is primarily utilized to wet the hydrodynamic bearings 136 before an imminent start (i.e., to prime the system), the injector 216 may also wet the hydrodynamic bearings 136 for/during shutdown of compressor 100 and/or during failure of pump 212. However, wetting the hydrodynamic bearings 136 immediately prior to starting may be critical because the high-speed shaft can reach 1000 revolutions in less than three seconds (e.g., 1-3 seconds).

Importantly, in both of the embodiments shown in FIGS. 10 and 11, injector 216 is positioned within the same housing as pump 212. For example, the injector 216 may be strapped, clamped, or otherwise fixed to an interior wall of a housing for pump module 210. Thus, additional supports, tubing, power supply lines, etc. that are often included on compressors to support an auxiliary pump are not necessary in compressor 100. For example, some compressors include a 5-7 horsepower auxiliary pump that requires separate electrical wiring, lubricant tubing, and space on the assembly frame 190. Compressor 100 eliminates all of these components by providing pre-lubing and in-operation lubing with a single pump module 210. In fact, in some embodiments, power can be run to injector 216 via a pre-existing opening in gearbox 125 to further reduce the parts required for the lubrication system.

Regardless of where injector 216 is positioned, the injector 216 may be controlled by a controller 260. The controller 260 may activate electronic or mechanical components of the injector 216 with on/off actuations, ramping actuations, modulated actuations, or in any manner now known or developed hereafter. An example computing device representative of controller 26 is described in detail below in connection with FIG. 21; however, generally, the controller 260 may include a memory, processor, and various other computing components to facilitate these actuations. The memory may store any computer readable instructions to be executed by the processor in connection with operating the injector 216 and/or any other components of compressor 100.

For example, the memory may store instructions that cause the processor to initiate injector 216 after an oil fill or change and to continue actuating the injector until a pressure threshold is reached at the hydrodynamic bearings 136 (as detected by pressure sensors included at or near the hydrodynamic bearings 136). The pressure threshold would indicate that the bearings are wet, but not necessarily fully pressurized. Then, at shutdown, the memory may include instructions that cause the injector 216 to maintain pressure at the pressure threshold for a predetermined amount of time (e.g., to ensure that lubricant pressure is maintained while the motor slows to a stop). The techniques/operations executed by the controller 260 are described in further detail below in connection with FIG. 20.

FIGS. 12-15 illustrate the lubrication system 200 included on compressor 100 from various perspectives. When considered together, the different perspectives clearly show the lubrication system 200. As mentioned above, initially, the pump module 210 receives lubricant via lubricant line 219 and pumps or injects lubricant into supply line 218. In this particular embodiment, the supply line 218 feeds directly into a filter 228 before splitting towards the cooler 220 and control valve 230. However, in other embodiments, the filter 228 could be downstream of the control valve 230 instead of upstream of the control valve 230. The cooler 220 circulates coolant via coolant lines 223 to cool the lubricant passing through cooler 220. For example, cooler 220 may be an air- or water-cooled cooler 220 and, thus, coolant lines 223 may circulate air or water via coolant lines 223 (with one line being a supply line and one line being a return line). Cooled lubricant exits cooler 220 at outlet line 224 and enters the control valve 230 to mix with lubricant delivered directly to the control valve 230 via supply line 218.

The lubricant exiting the control valve 230 flows to rail 240 (see FIG. 15) via line 229. As can be seen best in FIG. 15, rail 240 extends parallel to high-speed shaft 130 and, thus, can deliver lubricant to various components disposed on the high-speed shaft 130. In this particular embodiment, a first end 242 of rail 240 (also referred to as the distal end, despite being adjacent line 229) delivers lubricant to a first hydrodynamic bearing 136 (a distal bearing 136) and a second end 246 of rail 240 (also referred to as the proximal end) delivers lubricant to a second hydrodynamic bearing 136 (a proximal bearing 136). Additionally, and a central portion 244 includes holes or ports (not shown) sized and oriented to create a spray of lubricant that acts on the mesh point between the pinion 132 and the bull gear 154. The two ends 242, 246 of the rail 240 may deliver oil to the hydrodynamic bearings 136 via any desired tubing, piping, etc. For example, the ends 242, 246 may each include apertures that are connected via flexible hoses to ⅛ inch indents included in the hydrodynamic bearings 136.

Figure 16A:
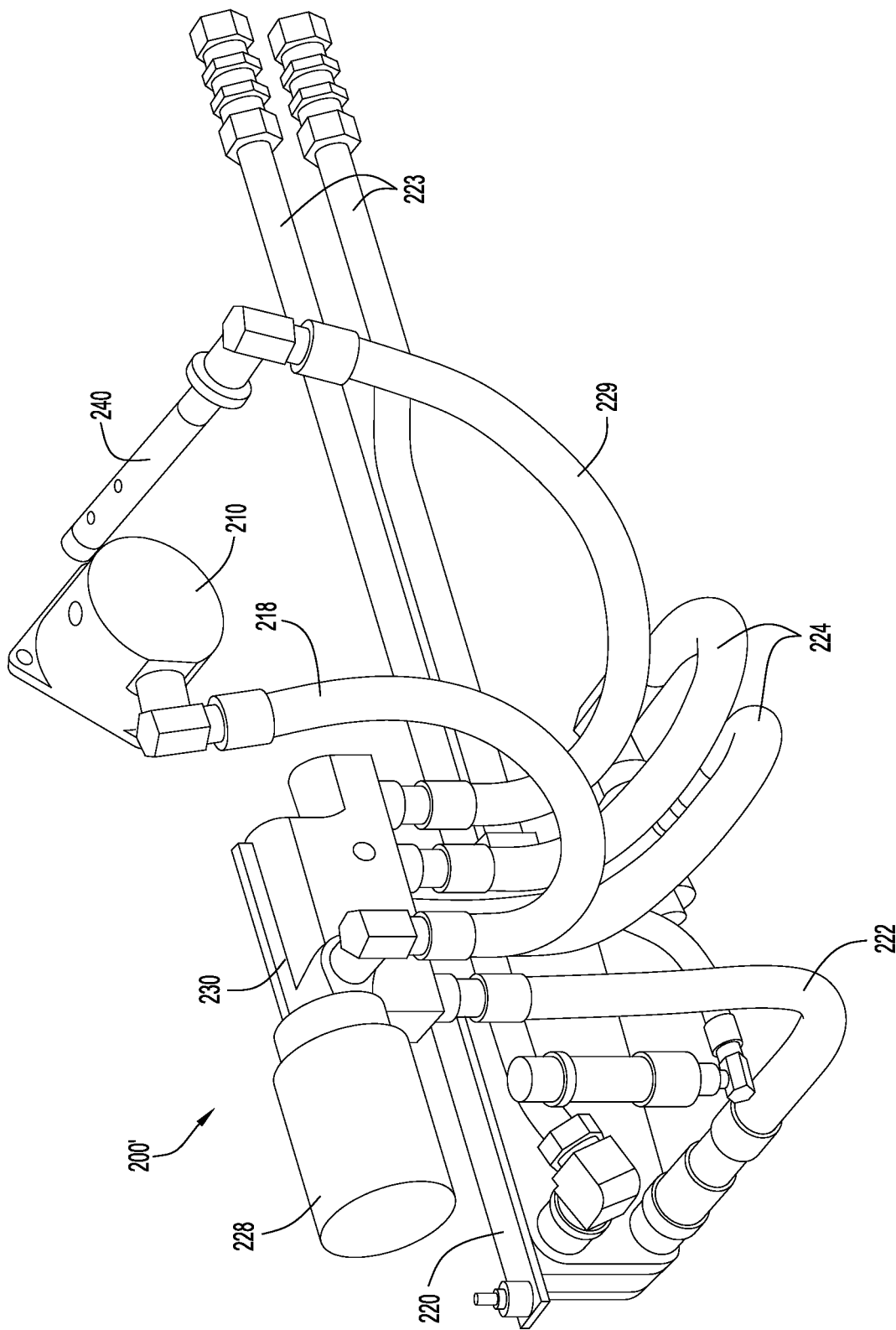
FIG. 16A is a perspective view of another example embodiment of a lubrication system that may be included in the compressor of FIGS. 1 and 2.
Figure 16B:
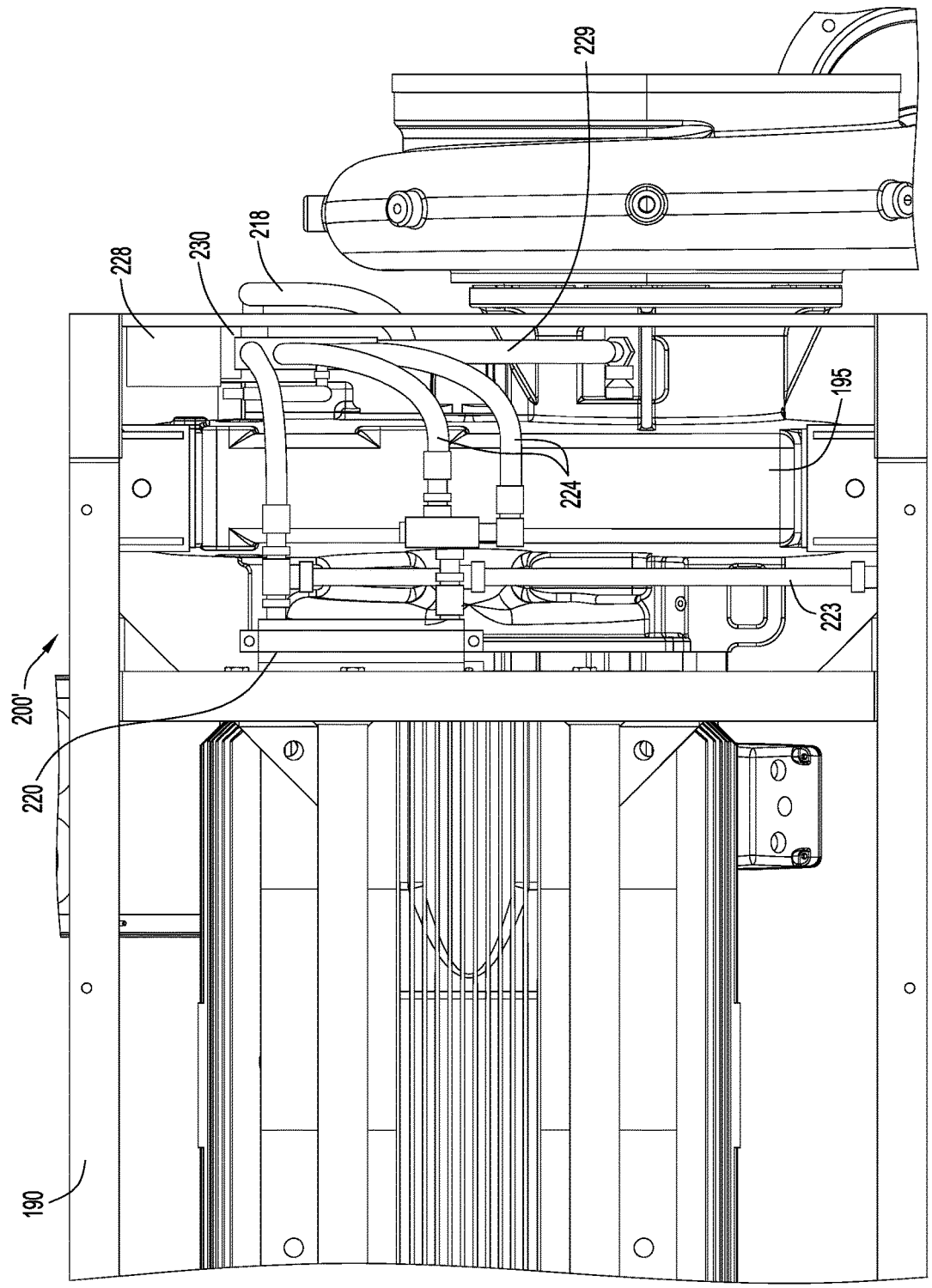
FIGS. 16B and 16C are a bottom view and top perspective view of the lubrication system of FIG. 16A installed on the compressor of FIGS. 1 and 2.
Figure 16C:
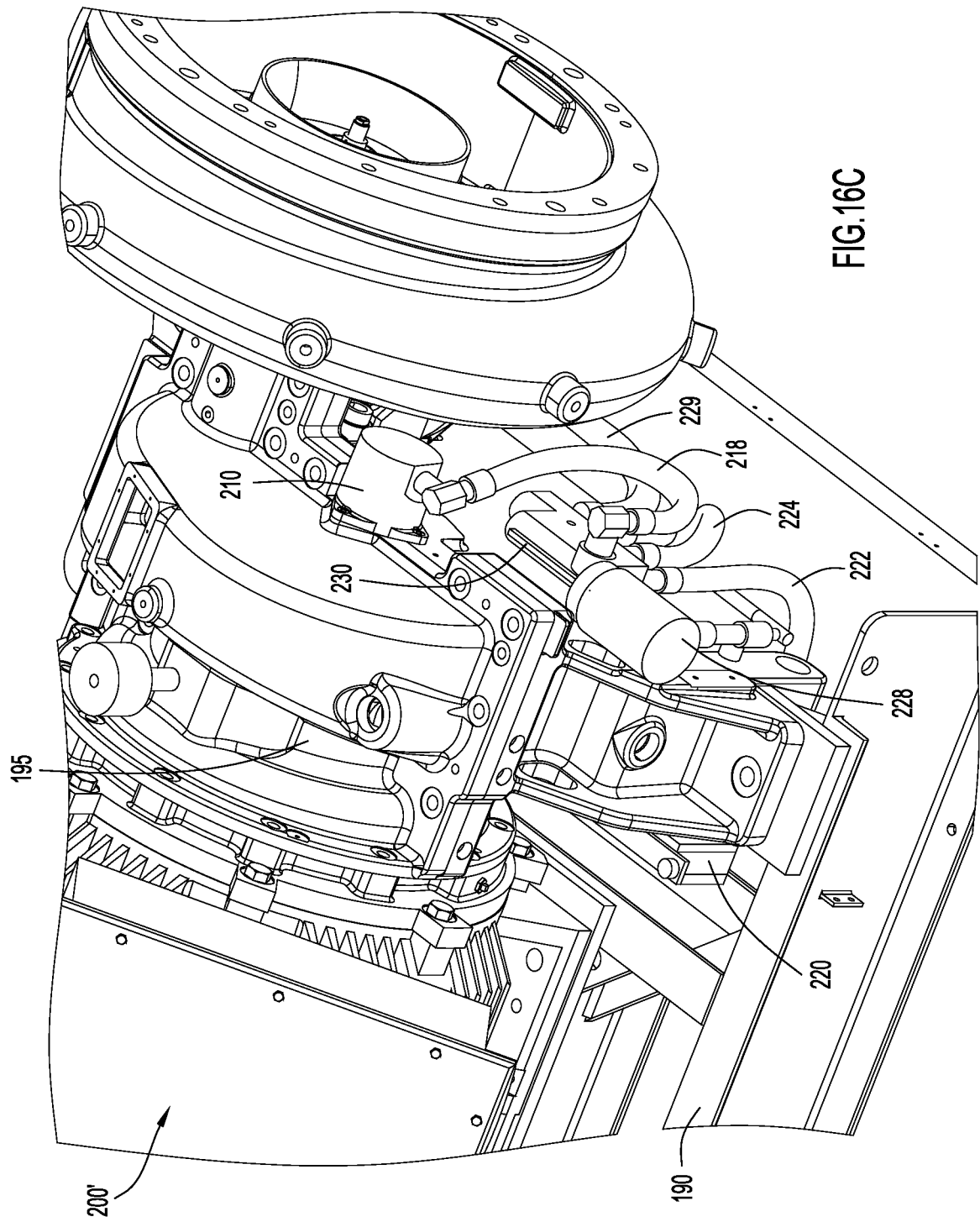
Figure 17A:
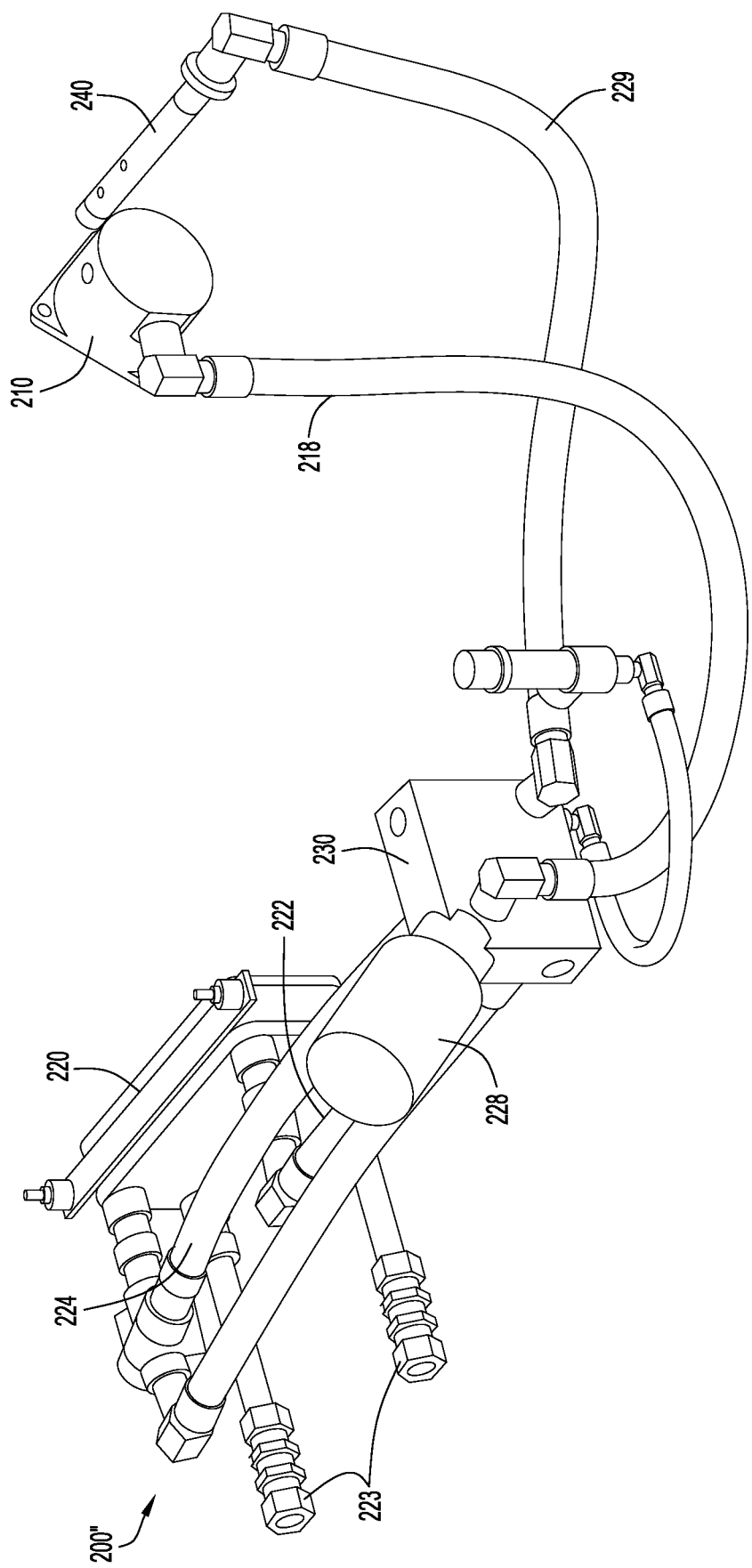

Now turning to FIGS. 16A-C, 17A, and 17B, while FIGS. 12-15 illustrate one example arrangement for lubrication system 200, that arrangement is only one example. FIGS. 16A-C illustrate another example lubrication system 200' and FIGS. 17A and 17B illustrate yet another example lubrication system 200''. In systems 200' and 200'', the pump module 210 still pumps or injects lubricant into supply line 218. However, now, supply line 218 feeds directly into control valve 230, which includes and/or is connected to filter 228. The control valve 230 then cycles lubricant through the cooler via lines 222 and 224 while directing cooled lubricant to rail 240 via line 229. This may reduce the amount of tubes/hoses and/or fittings needed in the lubrication system and, thus, further decrease the costs of manufacturing and maintaining the compressor/blower presented herein.

Moreover, lubrication system 200 is primarily positioned below or laterally exterior of the gearbox housing 195 (e.g., outside the gearbox, on the side opposite motor 150), but lubrication systems 200' and 200'' include components positioned laterally interior of the gearbox housing 195 (e.g., outside the gearbox, on the side opposite motor 150). Positioning components of the lubrication system laterally interior of the gearbox housing 195 may further reduce the overall footprint of the compressor/blower presented herein and/or reduce exposure of the lubrication system to potentially damaging effects (e.g., component movement), decreasing the costs of manufacturing and/or maintenance.

More specifically, lubrication system 200' and 200'' each include a cooler 220 that is vertically oriented (e.g., 90 degrees offset from the orientation of the cooler 220 of lubrication system 200) and is laterally interior of the gearbox housing 195. First, in lubrication system 200', the cooler 220 is mounted against a portion of assembly frame 190 that supports a distal end of motor 150 (the end of the motor adjacent the end shield 170 of the motor 150) as can be seen in FIGS. 16B and 16C. Meanwhile, control valve 230 is positioned laterally exterior of gearbox housing 195 and any tubes/hoses/lines connecting control valve 230 and cooler 220 run through or beneath gearbox housing 195. Second, and as can be seen in FIG. 17B, in lubrication system 200', the cooler 220 is mounted on a portion of the assembly frame 190 that extends along a length of the motor 150 and the control valve is also positioned laterally interior of the gearbox housing 195 (between the gearbox housing 195 and the motor 150). Then, any tubes/hoses/lines (e.g. line 229) connecting control valve 230 and rail 240 are run through or beneath gearbox housing 195.

Figure 18A:
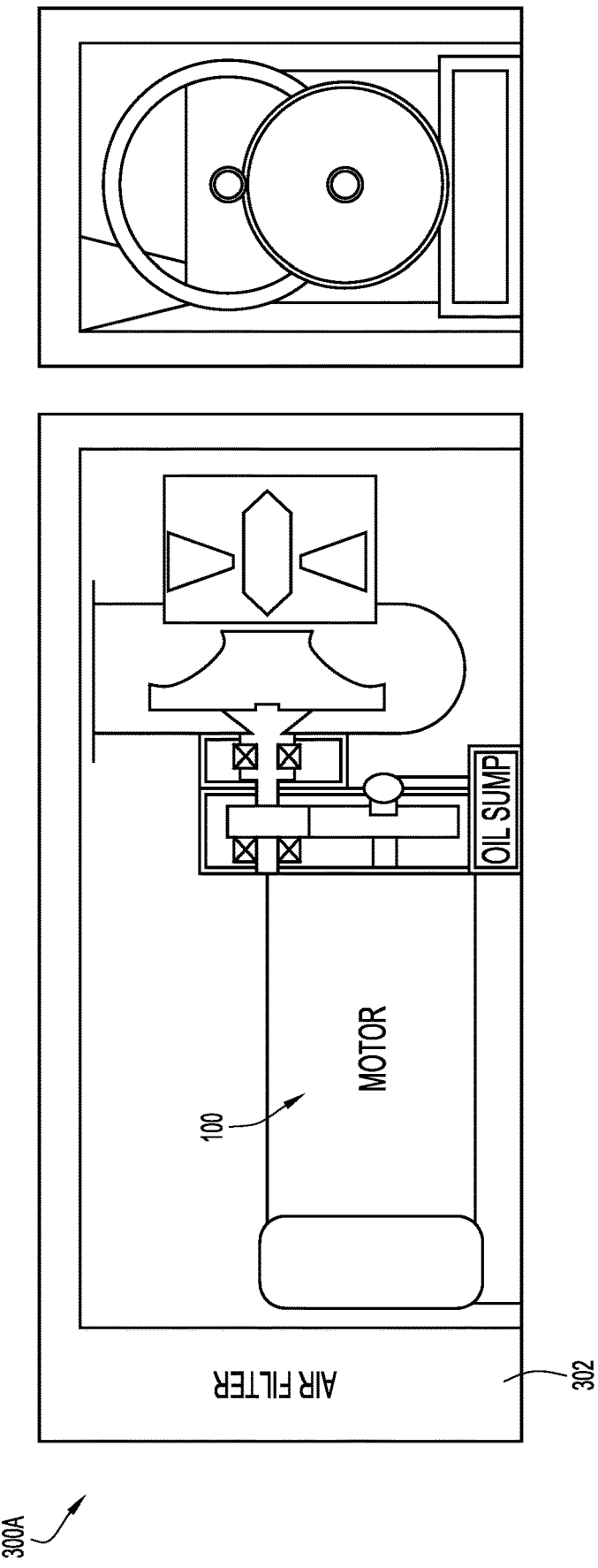
FIGS. 18A-18C are diagrams illustrating example deployments of the compressor of FIGS. 1 and 2, according to at least some embodiments of the present disclosure.
Figure 18B:
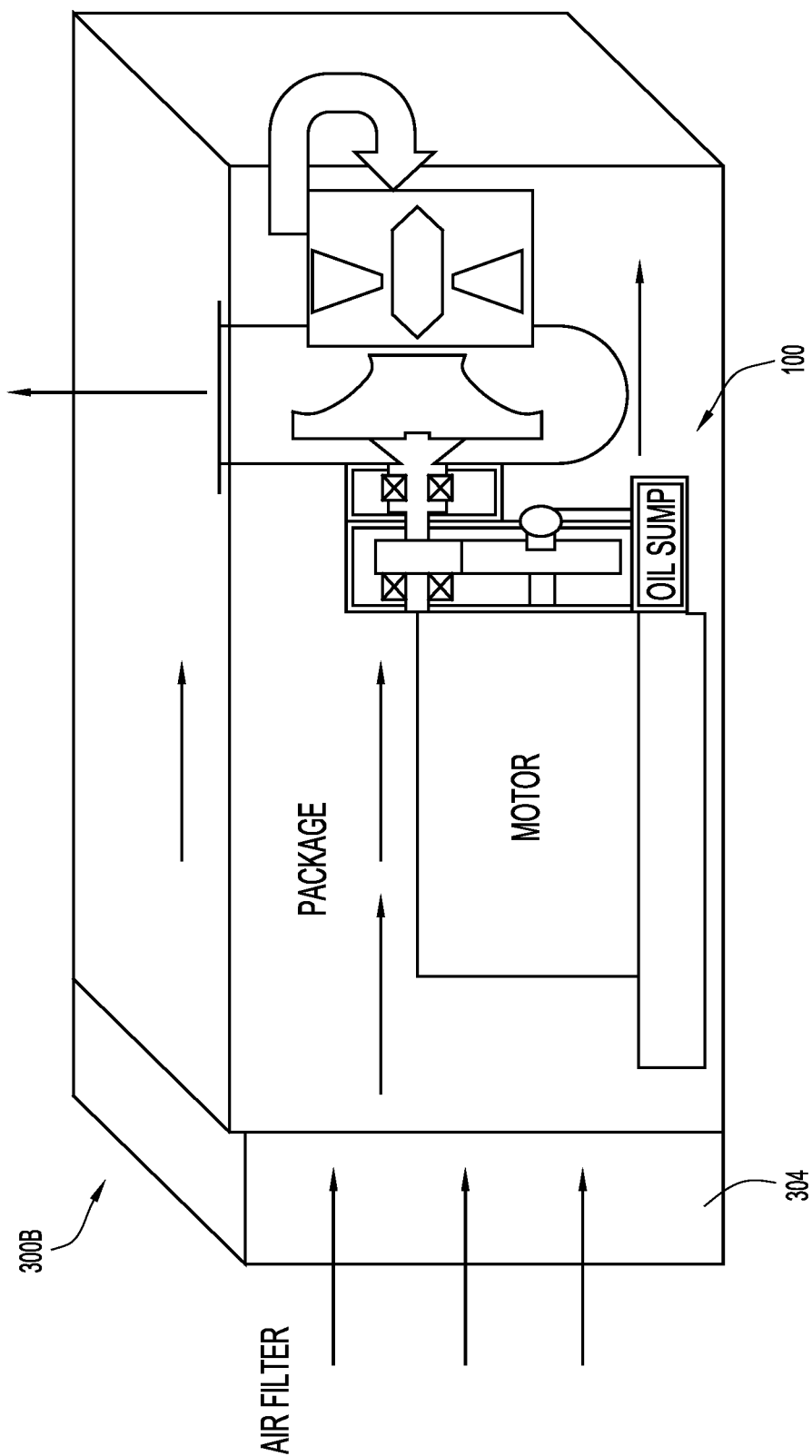
Figure 18C:
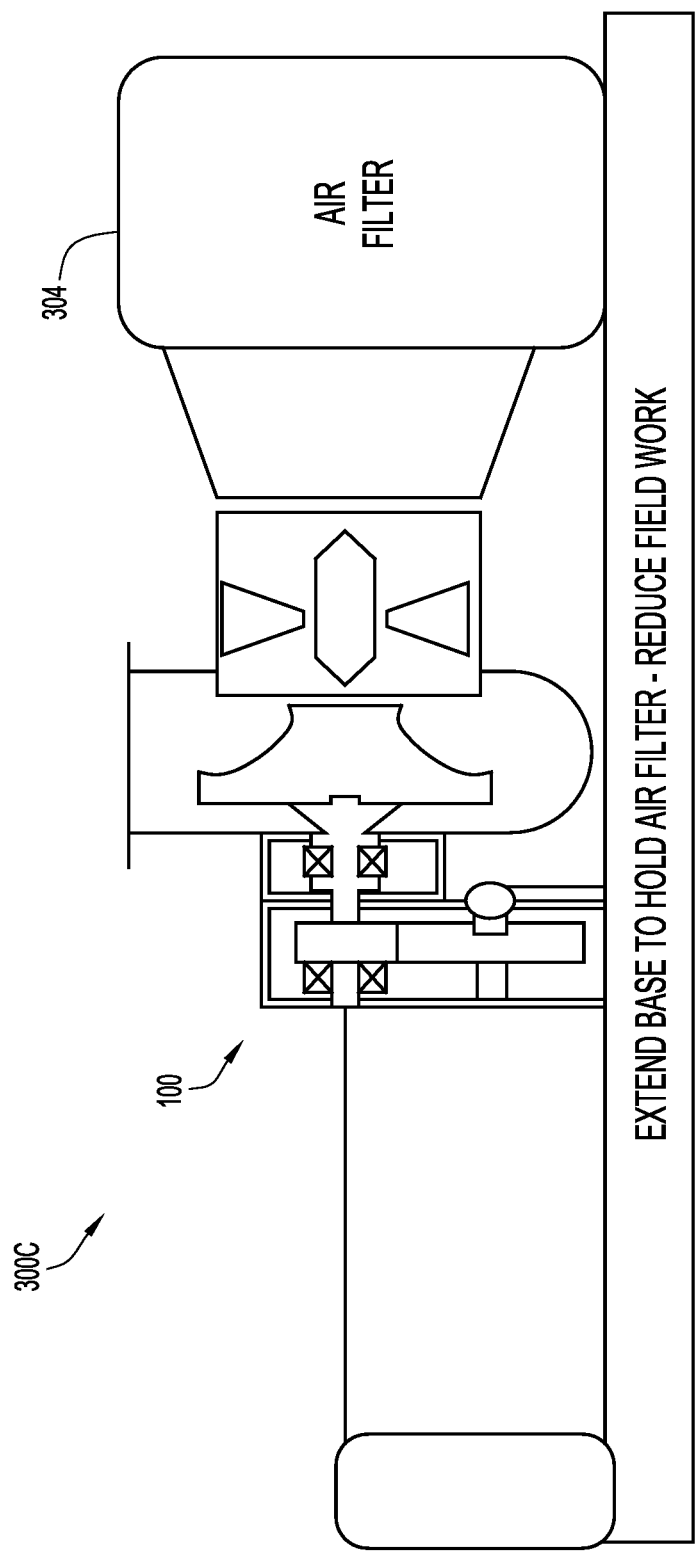

Now turning to FIGS. 18A-18C, in some instances, the compressor 100 can be a stand-alone unit, but in other instances, the compressor 100 presented herein may be packaged with additional components to form various assemblies/installations. As one example, compressor 100 can be enclosed within an air filter 302 to form a first assembly 300A. As another example, compressor 100 can be enclosed to form a second assembly 300B and one side of the enclosure may include an air filter 304 through which air is introduced to the compressor 100. As yet another example, the assembly frame 190 of compressor 100 can be extended to support an air filter 304 and the air filter 304 and compressor 100 may collectively form a third assembly 300C.

Figure 19:
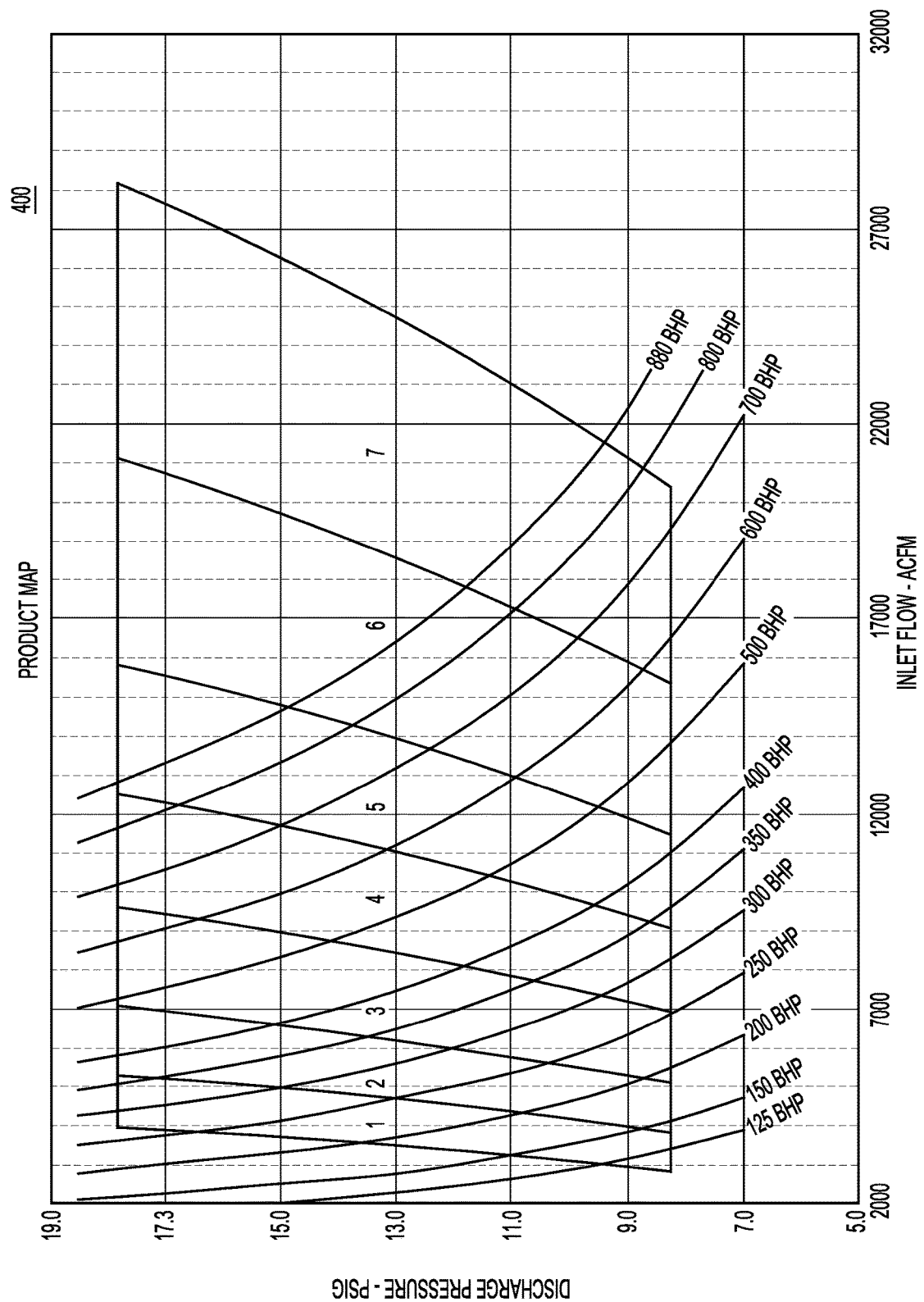
FIG. 19 is a diagram illustrating gas pressures, gas flows, and power that various embodiments of the compressor presented herein can output.

As mentioned, in different implementations, the compressor 100 can be modified to perform at different power parameters. FIG. 19 illustrates the various output pressures that a 60 Hz iteration of compressor 100 can produce when operating at different horsepower with different inlet pressures. However, this chart is not intended to be limiting and the compressor presented herein may be used in any number of manners. For example, despite being called a "compressor" herein, the compressor may function as a blower, vacuum, or any other type of device that moves air with an impeller.

Figure 20:
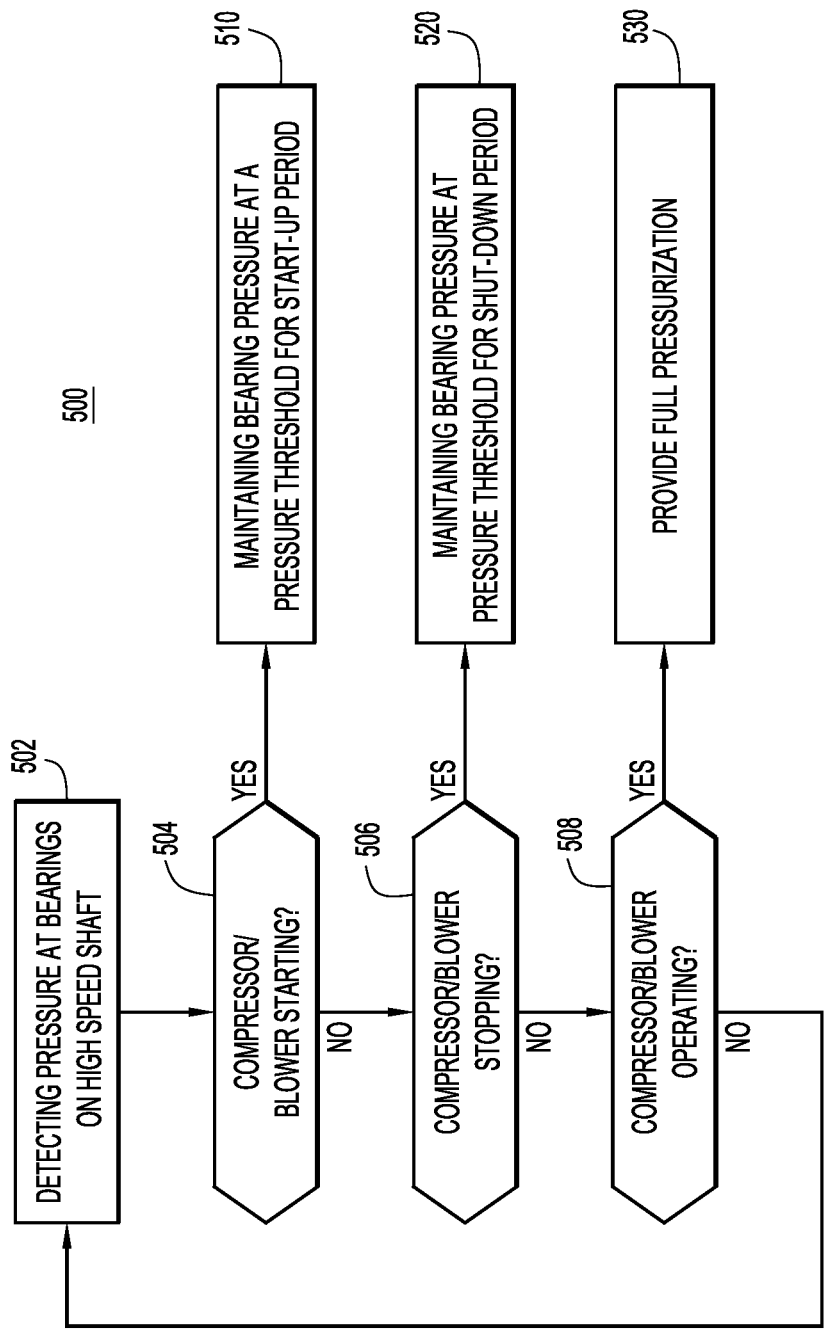
FIG. 20 is a flowchart illustrating a method for lubricating the compressor or blower presented herein, according to an example embodiment.

FIG. 20 illustrates an example method 500 that may be executed by a controller connected to (i.e., in communication with) the compressor/blower presented herein. Initially, at 502, the controller detects a pressure at one or more bearings on the high-speed shaft (e.g., hydrodynamic bearings 136 on high-speed shaft 130). In some embodiments, a single pressure sensor may detect a pressure representative of the pressure in all bearings on the high-speed shaft and detecting the pressure may comprise accumulating data from a single sensor. Alternatively, each bearing may have a sensor and detecting the pressure may comprise accumulating data from one or more of these sensors. For example, the controller may receive pressure data from two sensors and process this data to detect a pressure at two bearings. Although a sensor is not shown, a sensor may be disposed within a bearing on the high-speed shaft (e.g., hydrodynamic bearings 136 on high-speed shaft 130) or may be in communication with the bearings. Alternatively, a sensor may be in communication with a rail, tube/hose/line, or any other component of the lubrication system delivering lubricant to the bearings, provided the sensor is positioned sufficiently close to the bearings, such as downstream of a control valve, to provide accurate pressure readings. The sensor may be any pressure sensor now known or developed hereafter capable of generating data representative of lubricant pressure.

At 504, 506, and 508, the controller determines the operating status of the compressor or blower. That is, the controller determines if the compressor/blower is starting at 504, determines if the compressor/blower is stopping at 506, and determines if the compressor/blower is operating at 508. These determinations may be made by monitoring operations of the motor (e.g., motor 150), monitoring operations of the volute, and/or based on user inputs into the controller. Notably, although operations 504, 506, 508 are shown ins series after operation 502, operations 502, 504, 506, and 508 could be performed in any order or iteration and repeated at any time interval, provided that the execution of these operations determines an operating status of the compressor/blower while also detecting a pressure at bearings on the high-speed shaft of the compressor/blower. Moreover, although steps 510, 520, and 530 are shown as ending points of method 500, this is only for simplicity, and it is to be understood that these operations include constant or near-constant pressure evaluations (i.e., the method may have feedback loops from 510, 520, and/or 530 to 502, 504, 506, and/or 508).

If, at 504, the controller determines that compressor/blower is starting, the controller may, at 510, cause the pump module to maintain bearing pressure at a pressure threshold for a start-up period. The start-up period may be a predetermined period of time (e.g., 1-3 seconds) or may be a dynamically determined period of time, such as a time period determined based on motor operations. For example, the start-up period may last until the motor reaches a predetermined or set (e.g. user input) speed. The pressure threshold may ensure that the bearings are wet prior to and during this start-up. For example, in some instances, the pressure threshold may be set to any pressure under 5 pounds per square inch (psi), such as 5 psi, 3 psi, 0.5 psi, etc. This pressure may wet the bearings but does not provide full pressurization. In at least some embodiments, the pump module maintains the bearing pressure at the pressure threshold by utilizing its injector to inject lubricant through the lubrication system to the bearings. Notably, the mechanical pump does not operate prior to start-up and may not yet be operating at full speed during start-up.

If, at 506, the controller determines that compressor/blower is stopping, whether intentionally (e.g., due to scheduling or a user stop command) or due to a fault/error, the controller may, at 520, cause the pump module to maintain bearing pressure at a pressure threshold for a shut-down period. The shutdown period may be a predetermined period of time (e.g., 1-3 seconds) or may be a dynamically determined period of time, such as a period of time determined based on motor operations. For example, the shutdown period may last until the motor stops completely or reaches a minimum speed. The pressure threshold may ensure that the bearings are wet during this shut-down. For example, in some instances, the pressure threshold may be set to any pressure under 5 psi (e.g., 5 psi, 3 psi, 0.5 psi, etc.). The pump module maintains the bearing pressure at the pressure threshold by utilizing its injector and/or its mechanical pump. For example, the mechanical pump may continue supplying lubricant to the bearings as the motor slows, but if the controller determines that the pressure is falling beneath the threshold, the controller may cause the injector to supplement or act in place of the mechanical pump. That is, since the mechanical pump may slow as the motor slows, the injector may compensate for the mechanical pump and maintain the bearing pressure at the pressure threshold.

If, at 508, the controller determines that compressor/blower is operating, the controller may cause the lubrication system to provide the bearings with full pressurization at 530. For example, during operation, the motor of the compressor/blower may fully operate the mechanical pump in the pump module and the controller may monitor the pressure of the bearings during operations and control aspects of the mechanical pump (e.g., operating parameters), a control valve, or any other parts of the lubrication system accordingly.

Figure 21:
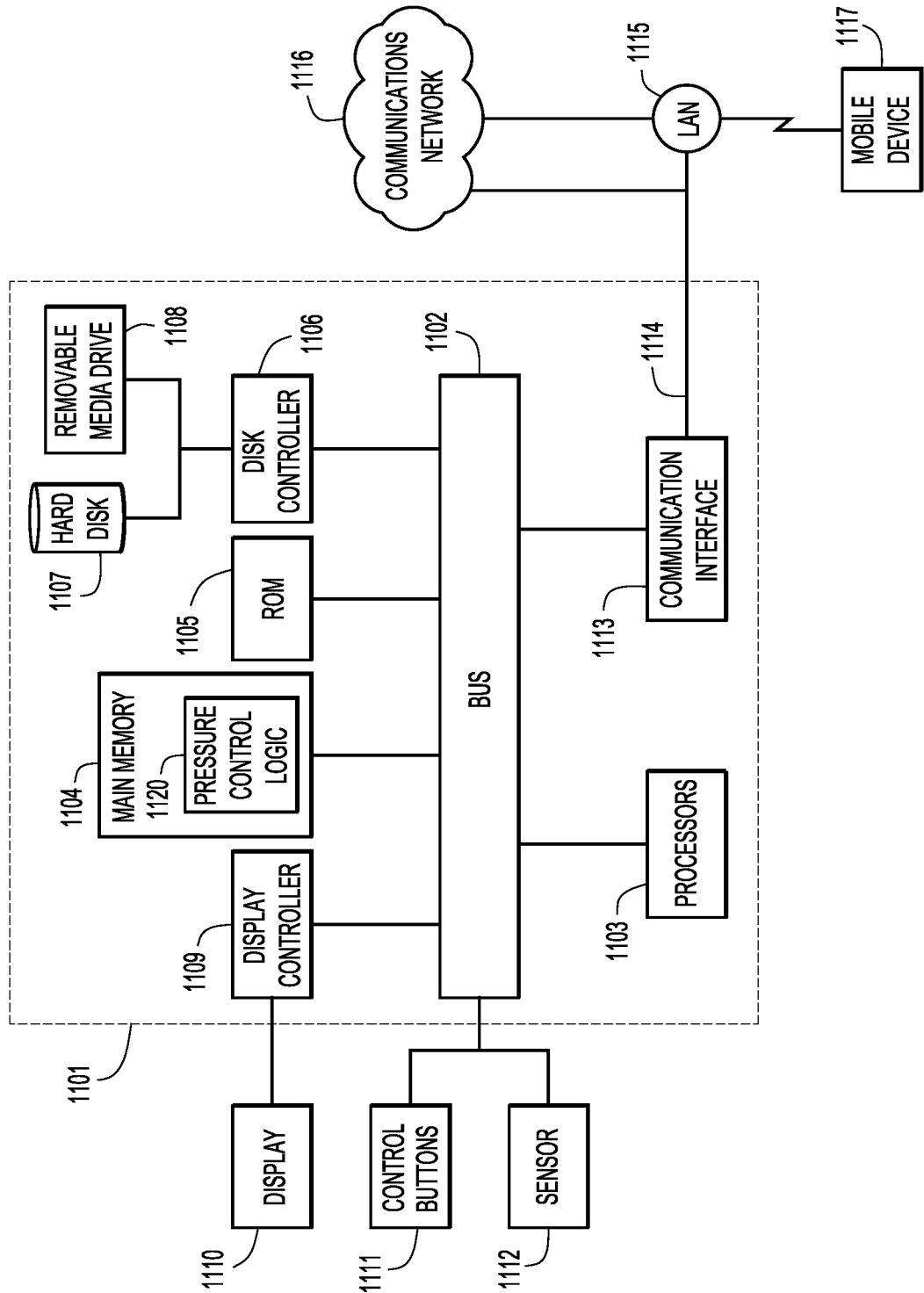
FIG. 21 is a simplified block diagram of a computing device that can be used to implement various embodiments of the disclosed technology, according to an example embodiment.

FIG. 21 illustrates an example hardware diagram of a computing apparatus 1101 on which the techniques (e.g., the techniques depicted in FIG. 20) provided herein may be implemented. For example, computing apparatus 1101 may be representative of controller 260. The apparatus 1101 includes a bus 1102 or other communication mechanism for communicating information, and processor(s) 1103 coupled with the bus 1102 for processing the information. While the figure shows a signal block for processor 1103, it should be understood that the processors 1103 represent a plurality of processing cores, each of which can perform separate processing. The apparatus 1101 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)), that, in addition to microprocessors and digital signal processors, may individually or collectively, act as processing circuitry. The processing circuitry may be located in one device or distributed across multiple devices.

The apparatus 1101 also includes a main memory 1104, such as a random access memory (RAM) or other dynamic storage device (e.g., dynamic RAM (DRAM), static RAM (SRAM), and synchronous DRAM (SD RAM)), coupled to the bus 1102 for storing information and instructions to be executed by processor(s) 1103. The memory 1104 pressure control logic 1120 that, when executed by the processor(s) 1103, enables the computing apparatus 1101 to perform the operations described herein (e.g., the techniques of FIG. 20). In addition, the main memory 1104 may be used for storing temporary variables or other intermediate information during the execution of instructions by the processor 1103. The apparatus 1101 further includes a read only memory (ROM) 1105 or other static storage device (e.g., programmable ROM (PROM), erasable PROM (EPROM), and electrically erasable PROM (EEPROM)) coupled to the bus 1102 for storing static information and instructions for the processor 1103.

The apparatus 1101 also includes a disk controller 1106 coupled to the bus 1102 to control one or more storage devices for storing information and instructions, such as a magnetic hard disk 1107, and a removable media drive 1108 (e.g., floppy disk drive, read-only compact disc drive, read/write compact disc drive, compact disc jukebox, tape drive, and removable magneto-optical drive). The storage devices may be added to the apparatus 1101 using an appropriate device interface (e.g., small computer system interface (SCSI), integrated device electronics (IDE), enhanced-IDE (E-IDE), direct memory access (DMA), or ultra-DMA). Thus, in general, the memory may comprise one or more tangible (non-transitory) computer readable storage media (e.g., a memory device) encoded with software comprising computer executable instructions and when the software is executed (by the processor) it is operable to perform the operations described herein.

The apparatus 1101 may also include a display controller 109 coupled to the bus 1102 to control a display 1110, for displaying information to a computer user. The computer system 1101 may also include input devices, such as a control buttons 1111 and sensor 1112, for interacting with a computer user and providing information to the processor 1103. The sensor 1112 may detect or sense a pressure of bearings (e.g., hydrodynamic bearings) included on the high-speed shaft of the compressor/blower presented herein. The control buttons may include push-buttons, rotary encoders, keyboards, and/or a pointing device, such as a mouse, a trackball, or a pointing stick for communicating directional information and command selections to the processor 1103 and for controlling cursor movement on the display 1110. In addition, a printer may provide printed listings of data stored and/or generated by the apparatus 1101.

The apparatus 1101 performs a portion or all of the processing steps described herein in response to the processor 1103 executing one or more sequences of one or more instructions contained in a memory, such as the main memory 1104. Such instructions may be read into the main memory 1104 from another computer readable medium, such as a hard disk 1107 or a removable media drive 1108. One or more processors in a multi-processing arrangement may also be employed to execute the sequences of instructions contained in main memory 1104. In alternative embodiments, hard-wired circuitry may be used in place of or in combination with software instructions. Thus, embodiments are not limited to any specific combination of hardware circuitry and software.

As stated above, the apparatus 1101 includes at least one computer readable medium or memory for holding instructions programmed according to the embodiments presented, for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SD RAM, or any other magnetic medium, compact discs (e.g., CD-ROM), or any other optical medium, punch cards, paper tape, or other physical medium with patterns of holes, or any other medium from which a computer can read.

Stored on any one or on a combination of non-transitory computer readable storage media, embodiments presented herein include software for controlling the apparatus 1101, for driving a device or devices for implementing the techniques presented herein (e.g., for executing pressure logic to maintain bearing pressure at, above, or below a pressure threshold), and for enabling the apparatus 1101 to interact with a human user (e.g., network engineers). Such software may include, but is not limited to, device drivers, operating systems, development tools, and applications software. Such computer readable storage media further includes a computer program product for performing all or a portion (if processing is distributed) of the processing presented herein.

The computer code devices may be any interpretable or executable code mechanism, including but not limited to scripts, interpretable programs, dynamic link libraries (DLLs), Java classes, and complete executable programs. Moreover, parts of the processing may be distributed for better performance, reliability, and/or cost.

The apparatus 1101 also includes a communication interface 1113 coupled to the bus 1102. The communication interface 1113 provides a two-way data communication coupling to a network link 1114 that is connected to, for example, a local area network (LAN) 1115, or to another communications network 1116 such as the Internet. For example, the communication interface 1113 may be a wired or wireless network interface card to attach to any packet switched (wired or wireless) LAN. As another example, the communication interface 1113 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 1113 sends and receives electrical, electromagnetic or optical signals that carry digital data streams representing various types of information.

The network link 1114 typically provides data communication through one or more networks to other data devices. For example, the network link 1114 may provide a connection to another computer through a local area network 1115 (e.g., a LAN) or through equipment operated by a service provider, which provides communication services through a communications network 1116. The local area network 1115 and the communications network 1116 use, for example, electrical, electromagnetic, or optical signals that carry digital data streams, and the associated physical layer (e.g., CAT 5 cable, coaxial cable, optical fiber, etc.). The signals through the various networks and the signals on the network link 1114 and through the communication interface 1113, which carry the digital data to and from the apparatus 1101 may be implemented in baseband signals, or carrier wave based signals. The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase, and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The apparatus 1101 can transmit and receive data, including program code, through the network(s) 1115 and 1116, the network link 1114 and the communication interface 1113. Moreover, the network link 1214 may provide a connection through a LAN 1115 to a mobile device 1117 such as a personal digital assistant (PDA) laptop computer, or cellular telephone.

It is to be understood that terms such as "left," "right," "top," "bottom," "front," "rear," "side," "height," "length," "width," "upper," "lower," "interior," "exterior," "inner," "outer" and the like as may be used herein, merely describe points or portions of reference and do not limit the present invention to any particular orientation or configuration. Further, the term "exemplary" is used herein to describe an example or illustration. Any embodiment described herein as exemplary is not to be construed as a preferred or advantageous embodiment, but rather as one example or illustration of a possible embodiment of the invention.

Although the disclosed inventions are illustrated and described herein as embodied in one or more specific examples, it is nevertheless not intended to be limited to the details shown, since various modifications and structural changes may be made therein without departing from the scope of the inventions and within the scope and range of equivalents of the claims. In addition, various features from one of the embodiments may be incorporated into another of the embodiments. Accordingly, it is appropriate that the appended claims be construed broadly and in a manner consistent with the scope of the disclosure as set forth in the following claims.

We claim:

1. A compressor or blower comprising:
   an impeller disposed on a high-speed shaft;
   a motor shaft that extends from an end shield of a motor;
   a gearbox disposed between the motor and the impeller, the gearbox including:
      a pinion disposed on the high-speed shaft; and
      a bull gear disposed directly on the motor shaft in engagement with the pinion; and
   a lubrication system comprising:
      an injector configured to wet bearings on the high-speed shaft prior to starting the motor; and
      a mechanically driven pump that is disposed on the motor shaft and configured to mechanically pump oil to the bearings during operation of the motor.

2. The compressor or blower of claim 1, wherein the gearbox further includes:
   a first thrust collar positioned on a first side of the pinion; and
   a second thrust collar positioned on a second side of the pinion, opposite the first side, wherein the first thrust collar and the second thrust collar are offset from one another along the high-speed shaft.

3. The compressor or blower of claim 1, wherein the lubrication system further comprises:
   a lubricant rail extending parallel to the high-speed shaft from a proximal end to a distal end, the proximal end being configured to supply lubricant to a bearing of the bearings, and a central section between the proximal end and the distal end being configured to lubricate a mesh point between the pinion and the bull gear.

4. The compressor or blower of claim 1, wherein the bearings on the high-speed shaft are hydrodynamic bearings that support and allow rotation of the high-speed shaft.

5. The compressor or blower of claim 1, further comprising:
   an assembly frame that supports the motor, the impeller, and the gearbox, the assembly frame having a width of or smaller than approximately four feet and a length of or smaller than approximately six feet.

6. The compressor or blower of claim 1, wherein the injector also primes the lubrication system.

7. The compressor or blower of claim 1, wherein the mechanically driven pump is coupled to the gearbox.

8. The compressor or blower of claim 7, wherein the mechanically driven pump is bolted to an interior surface of the gearbox.

9. The compressor or blower of claim 1, wherein the gearbox includes a housing with a top half and a bottom half, the top half being removably coupled to the bottom half and removable to provide access to components of the compressor or blower that require regular maintenance.

10. The compressor or blower of claim 1, further comprising:
    a sensor adapted to monitor lubrication at the bearings; and
    a controller operably coupled to the sensor and configured to execute computer readable instructions stored in a memory to, at startup of the motor, cause the injector to wet the bearings until a pressure detected by the sensor at the bearings reaches a pressure threshold that indicates the bearings are wet.

11. The compressor or blower of claim 1, further comprising:
    a sensor adapted to monitor lubrication at the bearings; and
    a controller operably coupled to the sensor and configured to execute computer readable instructions stored in a memory to, at shutdown of the motor, cause the injector to wet the bearings to maintain a pressure detected by the sensor at or above a pressure threshold for a predetermined amount of time, the pressure threshold indicating that the bearings are wet.

12. A compressor or blower comprising:
    an impeller disposed on a high-speed shaft;
    a motor shaft that extends from an end shield of a motor;
    a gearbox disposed between the motor and the impeller, the gearbox including:
       a pinion disposed on the high-speed shaft; and
       a bull gear disposed directly on the motor shaft in engagement with the pinion;
    a lubrication system with a single pump module comprising:
       an injector configured to wet bearings on the high-speed shaft prior to starting the motor; and a mechanically driven pump that is disposed on the motor shaft and configured to mechanically pump oil to the bearings during operation of the motor;

a sensor adapted to monitor lubrication at the bearings; and a controller operably coupled to the sensor and configured to execute computer readable instructions stored in a memory to:

at startup of the motor, cause the injector to wet the bearings until a pressure detected by the sensor at the bearings reaches a first pressure threshold that indicates the bearings are wet; and/or at shutdown of the motor, cause the injector to wet the bearings to maintain the pressure detected by the sensor at or above a second pressure threshold for a predetermined amount of time.

13. The compressor or blower of claim 12, wherein the lubrication system is configured to lubricate a mesh point between the pinion and the bull gear.

14. The compressor or blower of claim 12, wherein the controller is configured to cause the mechanically driven pump to mechanically pump oil to the bearings to maintain the pressure detected by the sensor at or above a third pressure threshold during operation of the motor.

15. A lubrication system for a compressor or blower, the lubrication system comprising:

an injector configured to wet a bearing on a shaft of the compressor or blower prior to starting a motor of the compressor or blower, the shaft being configured to drive rotation of an impeller during operation of the motor;

a mechanically driven pump configured to mechanically pump oil to the bearing during operation of the motor; and a sensor configured to monitor lubrication at the bearing.

16. The lubrication system of claim 15, comprising a controller operably coupled to the sensor and configured to:

at startup of the motor, cause the injector to wet the bearing until a pressure detected by the sensor at the bearing reaches a first pressure threshold; and/or at shutdown of the motor, cause the injector and/or the mechanically driven pump to mechanically pump oil to the bearing to maintain the pressure detected by the sensor at or above a second pressure threshold for a predetermined amount of time.

17. The lubrication system of claim 15, comprising a lubricant rail extending parallel to the shaft of the compressor or blower.

18. The lubrication system of claim 15, wherein the injector is configured to wet the bearing during shutdown of the motor.

19. The lubrication system of claim 15, wherein operation of the mechanically driven pump is suspended prior to starting the motor.

20. The lubrication system of claim 17, wherein the sensor is in communication with the lubricant rail.

* * * * *